(12) United States Patent
Eguchi et al.

(10) Patent No.: US 10,481,282 B2
(45) Date of Patent: Nov. 19, 2019

(54) RADIATION IMAGE CAPTURING APPARATUS

(71) Applicant: KONICA MINOLTA, INC., Chiyoda-ku (JP)

(72) Inventors: Mao Eguchi, Kokubunji (JP); Shugo Ishizaka, Suginami-ku (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/893,128

(22) Filed: Feb. 9, 2018

(65) Prior Publication Data

US 2018/0267182 A1    Sep. 20, 2018

(30) Foreign Application Priority Data

Mar. 15, 2017  (JP) .................................. 2017-050308

(51) Int. Cl.
*G01T 1/24* (2006.01)
*G06T 5/00* (2006.01)

(52) U.S. Cl.
CPC .............. *G01T 1/247* (2013.01); *G01T 1/244* (2013.01); *G06T 5/002* (2013.01)

(58) Field of Classification Search
CPC .......... G01T 1/247; G01T 1/244; G06T 5/002
See application file for complete search history.

(56) References Cited

U.S. PATENT DOCUMENTS

| 2009/0101798 A1* | 4/2009 | Yadid-Pecht | ........ | H04N 5/3532 |
| | | | | 250/208.1 |
| 2011/0127441 A1* | 6/2011 | Tanabe | .................. | A61B 6/585 |
| | | | | 250/370.08 |

FOREIGN PATENT DOCUMENTS

JP        2011-142476        7/2011

* cited by examiner

*Primary Examiner* — Hugh Maupin
(74) *Attorney, Agent, or Firm* — Cozen O'Connor

(57) ABSTRACT

A radiation image capturing apparatus that generates a plurality of frame images includes: radiation detecting devices that are arranged on a substrate and can generate electric charge; a voltage applying part that applies a reverse bias voltage to the radiation detecting devices; the data reading part that reads image data; and a noise detector that detects a voltage noise of the reverse bias voltage and outputs data, wherein the data reading part includes: an estimator that estimates an offset component; a noise data calculator that calculates noise data on the basis of the data output by the noise detector and the offset component estimated by the estimator; and an image correcting part that generates image data after correction by subtracting the noise data calculated by the noise data calculator.

5 Claims, 16 Drawing Sheets

RADIATION IMAGE CAPTURING APPARATUS

The entire disclosure of Japanese patent Application No. 2017-050308, filed on Mar. 15, 2017, is incorporated herein by reference in its entirety.

BACKGROUND

Technological Field

The present invention relates to a radiation image capturing apparatus.

Description of the Related Art

So called direct-type radiation image capturing apparatuses each generating electric charge in accordance with the dose of emitted radiation such as an X ray using a detection device so as to be converted into an electric signal and so-called indirect-type radiation image capturing apparatuses each converting emitted radiation into another electromagnetic wave (visible light or the like) having a different wavelength using a scintillator and then generating electric charge according to the energy of the converted electric wave so as to be converted into an electric signal by using a photoelectric conversion device such as a photodiode have been variously developed.

In the present invention, a detection device included in a direct-type radiation image capturing apparatus and a photoelectric conversion device included in an indirect-type radiation image capturing apparatus are referred to as radiation detecting device altogether.

In such a radiation image capturing apparatus, for example, as illustrated in FIG. 2, generally, a plurality of scanning lines 5 and a plurality of signal lines 6 arranged to intersect with each other on a radiation detecting part P (an area disposed inside dashed lines in the drawing) of a sensor substrate 4, and a radiation detecting device 7 is disposed in each small area r partitioned by the scanning lines 5 and the signal lines 6. In this way, the radiation detecting devices 7 are arranged in a two-dimensional shape (matrix pattern). A bias line 9 used for applying a reverse bias voltage to each radiation detecting device 7 is connected to the radiation detecting device 7, and the bias lines 9 are connected to a connecting wire 10.

When the process of reading image data from each radiation detecting device 7 is performed, an On voltage is sequentially applied to each line L1 to Lx of the scanning lines 5 from a gate driver 15b illustrated in FIG. 3, and electric charge is discharged from each radiation detecting device 7 to the signal line 6 through a thin film transistor (hereinafter referred to as a TFT) 8 that is a switching device in an On state, and the image data is read by each reading circuit 17.

Meanwhile in a portion in which the bias line 9 and the connecting wire 10 and the signal line 6 intersect with each other or the like, in order to prevent formation of a short circuit thereof, generally, an insulating layer is disposed. For this reason, in the intersection thereof, a structure having a capacitor shape is formed by the bias line 9 and the connecting wire 10 and the signal line 6 and the insulating layer therebetween.

A plurality of above-described intersections (for example, see a portion A illustrated in FIG. 2) of the bias line 9, the connecting wire 10, and the signal line 6 are formed over all the radiation detecting parts P. In the reverse bias voltage Vbias applied to each radiation detecting device 7 through the connecting wire 10 and the bias line 9, as illustrated in FIG. 21, generally, a noise (fluctuation) is generated. Hereinafter, a noise generated in a voltage such as the reverse bias voltage Vbias will be referred to as a voltage noise.

Meanwhile a reference voltage V0 is applied to the signal line 6, and, in the intersection of the bias line 9 and the connecting wire 10 and the signal line 6, electric charge corresponding to an electric potential difference V0−Vbias between the reference voltage V0 of the signal line 6 and the reverse bias voltage Vbias of the bias line 9 and the connecting wire 10 is generated due to parasitic capacitance thereof. A voltage noise generated in the reverse bias voltage Vbias as described above is converted into a noise of electric charge (hereinafter, referred to as an electric charge noise) due to parasitic capacitance, and accordingly, an electric charge noise corresponding to the voltage noise of the reverse bias voltage Vbias is generated in electric charge generated in the intersection of the bias line 9 and the connecting wire 10 and the signal line 6.

In addition, there are also cases where such an electric charge noise is generated due to parasitic capacitance that is formed not only in the intersection (for example, see the portion A illustrated in FIG. 2) of the bias line 9 and the connecting wire 10 and the signal line 6 but also in an intersection (for example, see a portion B illustrated in FIG. 2) of the scanning line 5 and the signal line 6.

Then, in the process of reading image data, for example, at a time point of time t0 illustrated in FIG. 21, when an On voltage is applied to a certain scanning line 5 from a gate driver 15b, and electric charge is discharged from each radiation detecting device 7 connected to the scanning line 5 to the signal line 6, an electric charge noise corresponding to a voltage noise generated in the reverse bias voltage Vbias (t0) at that time point is superimposed on the electric charge and flows into the reading circuit 17. For this reason, on each image data read from each radiation detecting device 7 at time t0, noise data having same magnitude corresponding to electric charge noise corresponding to the voltage noise generated in the reverse bias voltage Vbias(t0) is superimposed.

In addition, on each image data read from each radiation detecting device 7 connected to a scanning line 5 to which the On voltage is applied at time t1 that is different from that described above, while noise data similar to that described above is superimposed, the magnitude of the noise data is different from that of the noise data superimposed on the image data read at time t0. Furthermore, on each image data read from each radiation detecting device 7 connected to a scanning line 5 to which the On voltage is applied at time t2 that is further different from that described above, while the similar noise data is superimposed, the magnitude of the noise data is different from that of each noise data superimposed on the image data read at time t0 or t1.

For this reason, the magnitude of the noise data superimposed on image data is different for each scanning line 5 in this way, and accordingly, in a case where a radiation image is generated on the basis of each image data read as described above, a shape of a stripe pattern extending in an extending direction (usually, this direction is a horizontal direction) of the scanning line appears. This shape of the stripe pattern, generally, is called a horizontal streak noise.

In order to prevent the appearance of such a horizontal streak noise in a radiation image, for example, in JP 2011-142476 A, a radiation image capturing apparatus reducing the influence of a horizontal streak noise has been disclosed in which a noise detecting circuit converting a voltage noise generated in a reverse bias voltage Vbias of the bias line 9 or the connecting wire 10 as described above into an electric charge noise and detecting the electric charge noise is arranged, and, when the process of reading image data is performed, at the time of reading image data by sequentially applying the On voltage to the lines L1 to Lx of the scanning lines 5 from the gate driver 15b, the noise detecting circuit simultaneously reads noise data, and the noise data is subtracted from the image data.

When the configuration disclosed in JP 2011-142476 A is employed, for example, in the case of simple capturing (also referred to as still-image capturing or the like) in which a still image is captured by emitting radiation from a radiation emitting apparatus to a radiation image capturing apparatus only once, it is known that the influence of a horizontal streak noise can be eliminated from a captured still image relatively well.

However, in the radiation image capturing apparatus configured as described in JP 2011-142476 A, it is known according to the research of the inventors of the present invention, when a moving image is captured, the temperature of a reading circuit rises, and an offset component included in a signal value output from the noise detecting circuit increases according to elapse of time (when the capturing of a frame image is repeated).

Since the image data of the radiation detector is corrected by eliminating a noise component from a signal value output from the radiation detector by using a signal value output from the noise detecting circuit, an increase in the offset component of the signal value output from the noise detecting circuit represents that a more signal value is unnecessarily subtracted at the time of correction in a later frame image.

When such correction is performed for each frame image, the influence of a horizontal streak noise of each frame image can be eliminated. However, in a case where each frame image is reproduced as a moving image, there is a possibility that a later frame cannot be easily viewed or includes an erroneous content. Then, there is a possibility that a doctor or the like who reads this moving image performs an erroneous diagnosis.

SUMMARY

An object of the present invention is to provide a radiation image capturing apparatus capable of reducing also the influence of variations in the offset component of the signal value of the noise detecting circuit while reducing the influence of a horizontal streak noise for a generated radiation image at the time of capturing a moving image or the like.

To achieve the abovementioned object, according to an aspect of the present invention, there is provided a radiation image capturing apparatus that generates a plurality of frame images by consecutively repeating generation of electric charge in a radiation detecting device and reading of image data using a data reading part, and the radiation image capturing apparatus reflecting one aspect of the present invention comprises:

a plurality of radiation detecting devices that are arranged on a substrate to be distributed in a two-dimensional shape and can generate electric charge by receiving radiation;

a voltage applying part that applies a reverse bias voltage to each of the plurality of radiation detecting devices;

the data reading part that reads image data on the basis of electric charge generated by each of the plurality of radiation detecting devices; and a noise detector that detects a voltage noise of the reverse bias voltage and outputs data on the basis of the voltage noise in accordance with the reading of the image data, wherein the data reading part includes:

an estimator that estimates an offset component on the basis of data corresponding to a prior frame image output by the noise detector in accordance with reading of image data of the prior frame image of one frame image among the plurality of frame images;

a noise data calculator that calculates noise data on the basis of the data output by the noise detector in accordance with the reading of the image data of the one frame image and the offset component estimated by the estimator on the basis of the data corresponding to the prior frame image output by the noise detector in accordance with the reading of the image data of the prior frame image; and an image correcting part that generates image data after correction by subtracting the noise data calculated by the noise data calculator in accordance with the reading of image data of the one frame image from the image data of the one frame image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of a radiation image capturing apparatus according to the present invention will be described with reference to the drawings. However, the scope of the invention is not limited to the disclosed embodiments.

Here, while a portable radiation image capturing apparatus will be described as an example, the present invention can be applied also to a radiation image capturing apparatus that is formed integrally with a support stand or the like.

[Radiation Image Capturing Apparatus]

Figure 1:
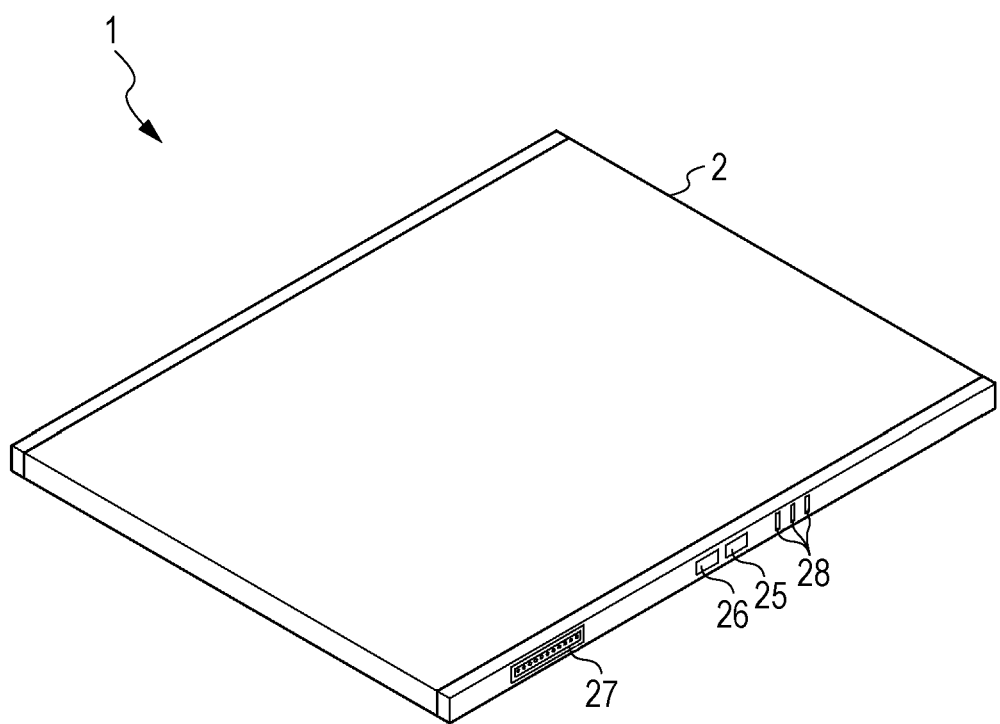
FIG. 1 is a perspective view that illustrates the outer appearance of a radiation image capturing apparatus according to this embodiment.
Figure 2:
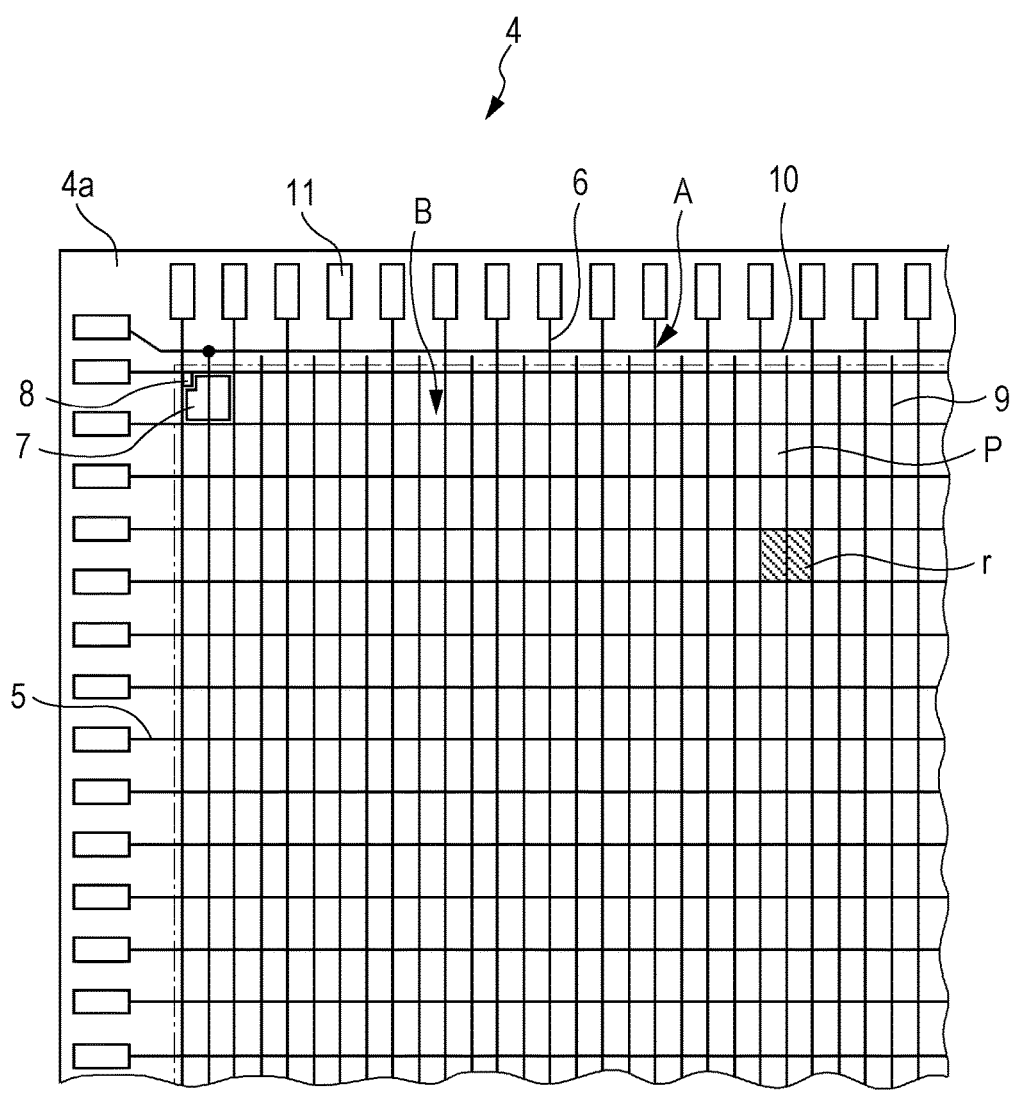
FIG. 2 is a plan view that illustrates an example of the configuration of a sensor substrate.
Figure 3:
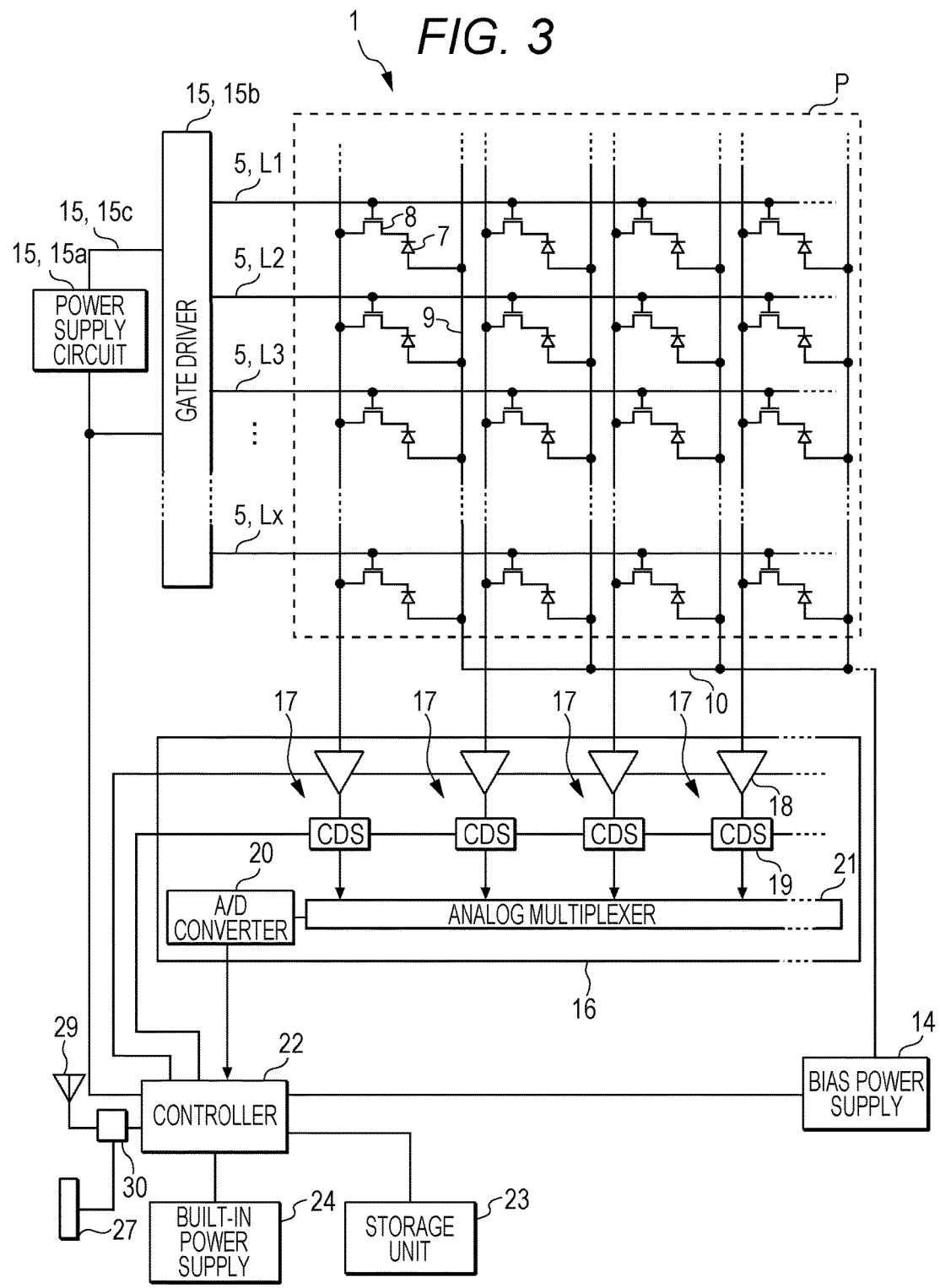
FIG. 3 is a block diagram that illustrates an equivalent circuit of the radiation image capturing apparatus.
Figure 4:
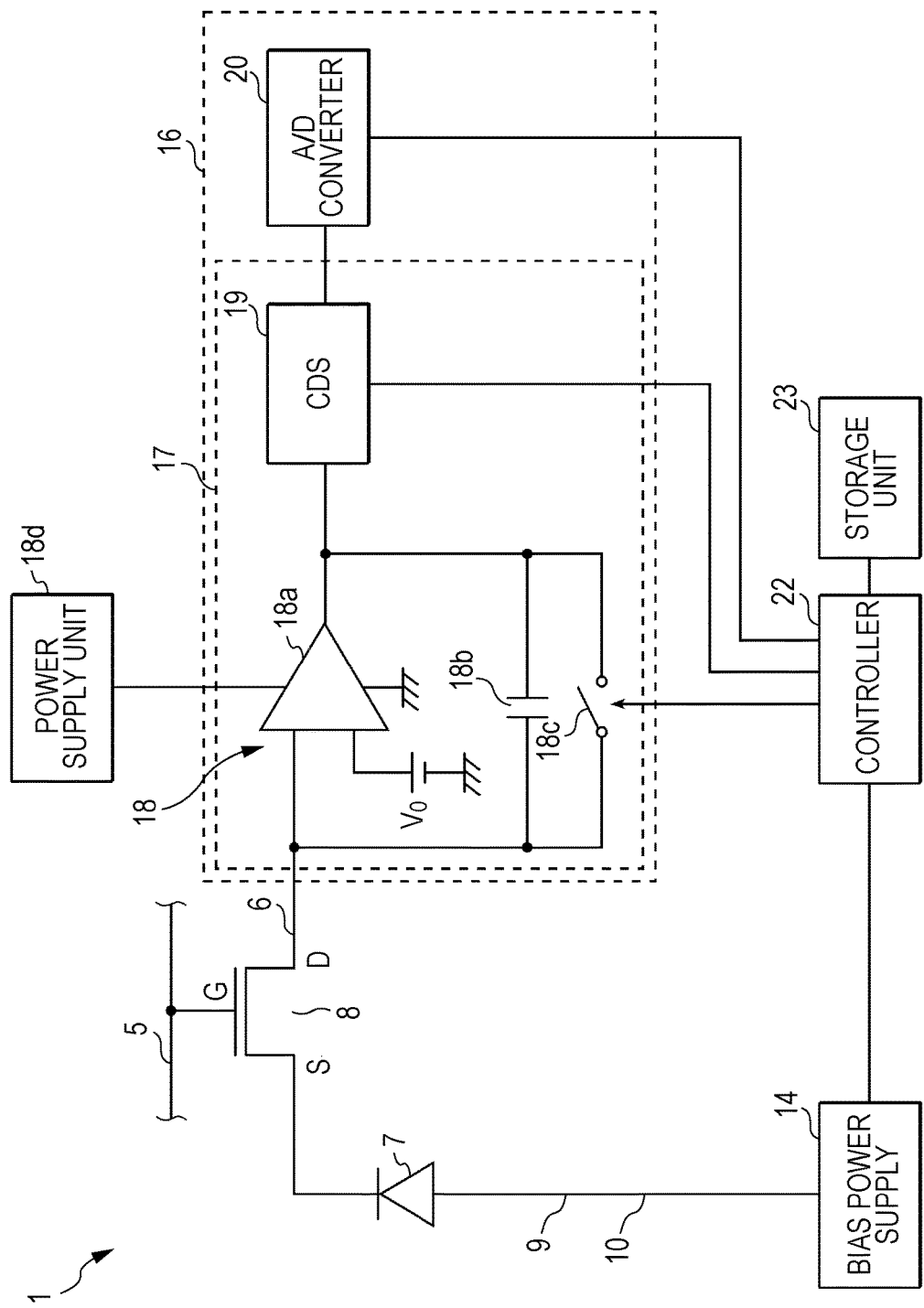
FIG. 4 is a block diagram that illustrates an equivalent circuit corresponding to one pixel configuring a detector.

FIG. 1 is a perspective view that illustrates the outer appearance of a radiation image capturing apparatus 1 according to this embodiment, and FIG. 2 is a plan view that illustrates an example of the configuration of a sensor substrate 4 built in the radiation image capturing apparatus. In addition, FIG. 3 is a block diagram that illustrates an equivalent circuit of the radiation image capturing apparatus 1, and FIG. 4 is a block diagram that illustrates an equivalent circuit corresponding to one pixel thereof. FIGS. 5A to 5D to FIG. 7 are timing diagrams illustrating the operation of the radiation image capturing apparatus.

As illustrated in FIG. 1, on one side face of a casing 2 of the radiation image capturing apparatus 1, a power switch 25, a change-over switch 26, a connector 27, an indicator 28, and the like are arranged. In addition, on the opposite side face of the casing 2, an antenna 29 (see FIG. 3) used for communicating with the outside using a radio system is disposed.

The radiation image capturing apparatus 1 houses the sensor substrate 4 in which a plurality of radiation detecting devices 7 are arranged and the like inside the casing 2.

As illustrated in FIGS. 2 and 3, in this embodiment, a plurality of radiation detecting devices 7 are arranged in a two-dimensional pattern on a surface 4a of the sensor substrate 4, and an area (an area surrounded by broken lines in the drawing) in which the plurality of radiation detecting devices 7 are arranged is set as a radiation detecting part P. In this embodiment, a plurality of scanning lines 5 and a plurality of signal lines 6 are arranged on the sensor substrate 4 to intersect with each other, and each of the radiation detecting devices 7 is disposed in each small area r partitioned by the scanning lines 5 and the signal lines 6.

As illustrated in FIGS. 2 to 4, a bias line 9 is connected to each of the radiation detecting devices 7. In this embodiment, each bias line 9 is connected to a connecting wire 10, and, at a place denoted by A in FIG. 2 and the like, the connecting wire 10 and each signal line 6 intersect with each other through an insulating layer not illustrated in the drawing. A reverse bias voltage Vbias is applied from a bias power supply 14 to each radiation detecting device 7 through the bias line 9 and such a connecting wire 10. In other words, a voltage applying part according to the present invention is configured by the bias line 9 and the bias power supply 14.

In each radiation detecting device 7, electric charge corresponding to the dose of emitted radiation is generated inside each radiation detecting device 7.

In addition, each radiation detecting device 7 is connected to the signal line 6 through a TFT 8 as a switching device. As illustrated in FIG. 2, in end portions of the scanning line 5, the signal line 6, the connecting wire 10, and the like, pads 11 are disposed. Each wiring of a flexible circuit board not illustrated in the drawing or the like is connected to each of the pads 11, and the scanning line 5, the signal line 6, the connecting wire 10, and the like are connected to electronic components (the bias power supply 14 and the like), which is not illustrated in the drawing, disposed on the rear face side of the sensor substrate 4.

In a scanning driving unit 15, a voltage is switched by a gate driver 15b between an On voltage and an Off voltage supplied from a power supply circuit 15a through a wiring 15c and is applied to each line L1 to Lx of the scanning lines 5. When the Off voltage is applied through the scanning line 5, each TFT 8 becomes an Off state, blocks conduction between the radiation detecting device 7 and the signal line 6, and causes electric charge to be accumulated inside the radiation detecting device 7. On the other hand, when the On voltage is applied through the scanning line 5, the TFT 8 becomes an On state and discharges electric charge accumulated inside the radiation detecting device 7 to the signal line 6.

In addition, each signal line 6 is connected to each reading circuit 17 built in a reading IC 16. The reading circuit 17 is configured by an integration circuit 18, a correlated double sampling circuit 19, an analog multiplexer 21, and an A/D converter 20. In FIGS. 3 and 4, the correlated double sampling circuit 19 is denoted by CDS. In FIG. 4, the analog multiplexer 21 is not illustrated.

Figure 9:
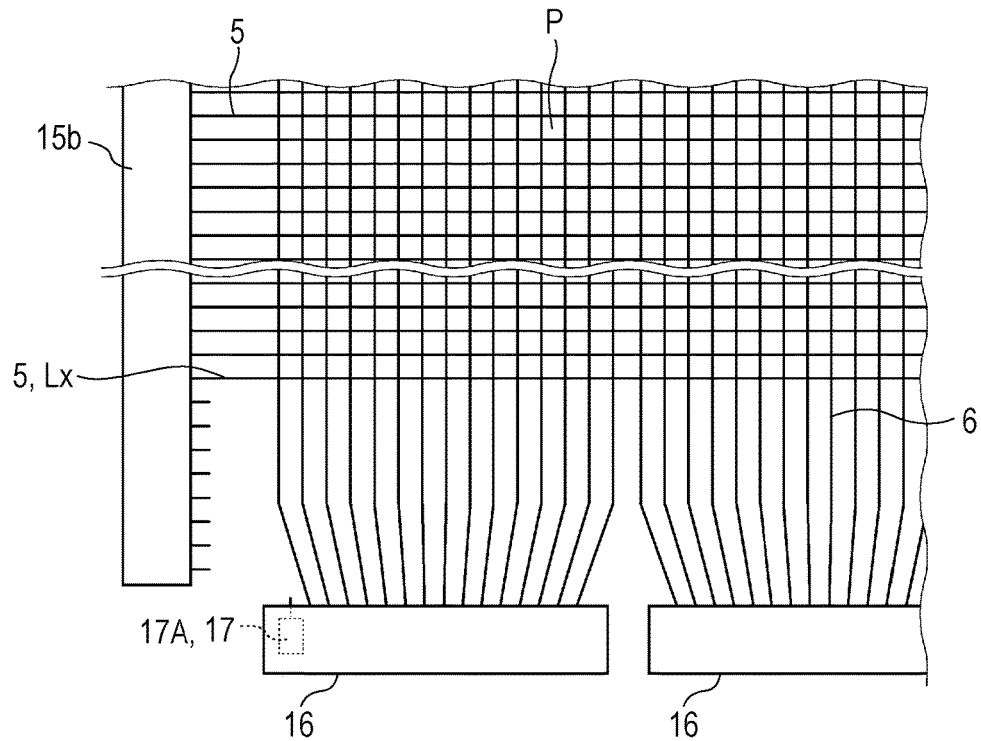
FIG. 9 is a diagram that describes the use of a reading circuit to which a signal line is not connected as a reading circuit of the noise detector.

In FIG. 3, while the sensor substrate 4 in which only one reading IC 16 is included has been illustrated as an example, as illustrated in FIG. 9, a plurality of reading ICs 16 may be included and receive supply of power from mutually-different power supply circuits to be driven.

In this embodiment, the integration circuit 18, as illustrated in FIG. 4, is configured by connecting an operational amplifier 18a, a capacitor 18b, and an electric charge resetting switch 18c in parallel. The signal line 6 is connected to an inverted input terminal of the operational amplifier 18a of the integration circuit 18, and a reference voltage V0 is applied to a non-inverted input terminal of the integration circuit 18. For this reason, the reference voltage V0 is applied to each signal line 6.

The electric charge resetting switch 18c of the integration circuit 18 is connected to a controller 22 to be described later and is controlled to be turned On/Off by the controller 22. When the TFT 8 becomes the On state in a state in which the electric charge resetting switch 18c is Off, electric charge discharged from the radiation detecting device 7 flows into the capacitor 18b to be accumulated therein, and a voltage value corresponding to the amount of the accumulated electric charge is output from an output terminal of the operational amplifier 18a.

In addition, by setting the electric charge resetting switch 18c to be in the On state, the input side and the output side of the integration circuit 18 form a short circuit, and electric charge accumulated in the capacitor 18b is discharged to be reset. The integration circuit 18 has power supplied from a power supplying unit 18d to be driven.

When the process (see FIGS. 6 and 7 to be described later) of reading image data D from each radiation detecting device 7, which is performed after capturing, is performed, as illustrated in FIGS. 5A to 5D, at a time point at which the electric charge resetting switch 18c of the integration circuit 18 is turned off, when a first pulse signal Sp1 is transmitted by the controller 22, the correlated double sampling circuit 19 maintains a voltage value Vin output from the integration circuit 18 at that time point.

Then, the On voltage is applied from the gate driver 15b to a line Ln of the scanning line 5. Then, when the TFT 8 becomes the On state, electric charge is discharged to the signal line 6 from the radiation detecting device 7 connected to the line Ln of the scanning line 5 through the TFT 8, the electric charge flows into the capacitor 18b of the reading circuit 17 through the signal line 6, and an output value output from the integration circuit 18 increases.

When a second pulse signal Sp2 is transmitted from the controller 22, the correlated double sampling circuit 19 maintains a voltage value Vfi output from the integration circuit 18 at that time point and outputs and reads such a difference Vfi−Vin as image data D having an analog value. Then, the output image data D is sequentially transmitted to the A/D converter 20 through the analog multiplexer 21 and is sequentially converted into image data D having a digital value by the A/D converter 20 to be sequentially stored in a storage unit 23. In other words, a data reading part according to the present invention is configured by the TFT 8, the scanning line 5, the signal line 6, the scanning driving unit 15, the reading IC 16, the controller 22, and the like.

Figure 5:
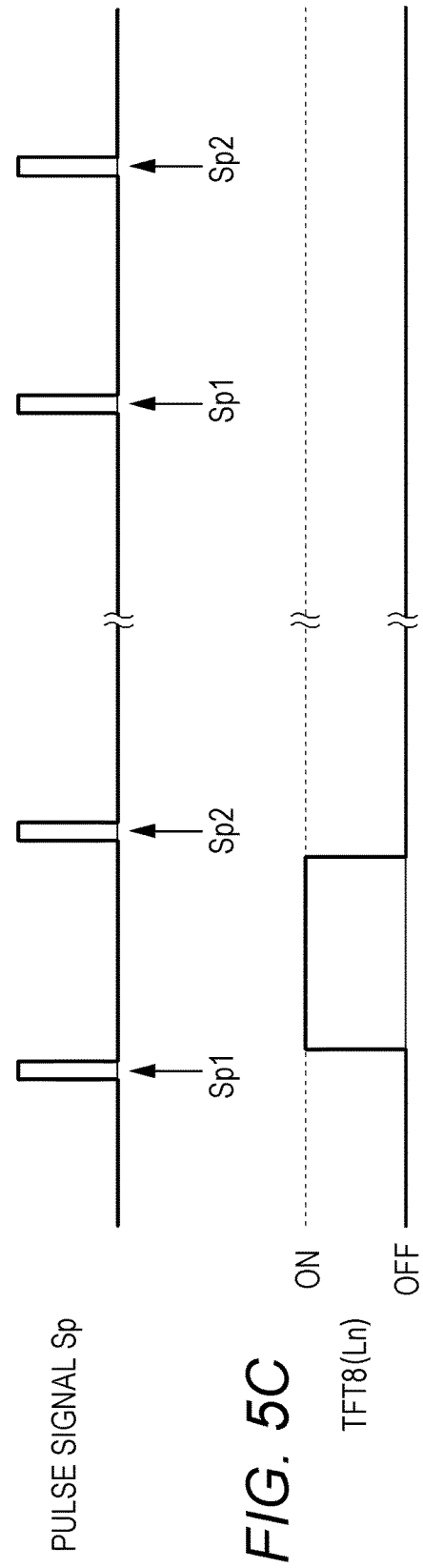
FIGS. 5A to 5D are timing diagrams respectively illustrating voltage changes in an electric charge resetting switch (FIG. 5A), a pulse signal (FIG. 5B), a certain scanning line (FIG. 5C), and the next scanning line (FIG. 5D) when the process of reading image data is performed.

Then, as illustrated in FIGS. 5C and 5D, the On voltage is sequentially applied (in the case illustrated in FIGS. 5C and 5D, the On voltage is sequentially applied to the line Ln and the next line Ln+1 of the scanning line 5) to each line L1 to Lx of the scanning lines 5 from the gate driver 15b, and the process described above is repeatedly performed, whereby image data D is read from each radiation detecting device 7.

The controller 22 is configured by a computer in which a central processing unit (CPU), a read only memory (ROM), a random access memory (RAM), an input/output interface, and the like, which are not illustrated in the drawing, are connected to a bus, a field programmable gate array (FPGA), or the like. The controller 22 may be configured by a dedicated control circuit.

In addition, the storage unit 23 configured by a static RAM (SRAM), a synchronous DRAM (SDRAM), a NAND flash memory, or the like and a built-in power supply 24 are connected to the controller 22, and a communication unit 30 used for communicating with the outside through the antenna 29 or the connector 27 described above by using a radio system or a wired system is connected to the controller 22.

The controller 22 is configured to perform control such as execution of the process of resetting the radiation detecting device 7 by controlling the operation of the scanning driving unit 15, application of an Off voltage from the gate driver 15b of the scanning driving unit 15 to each TFT 8 through each line L1 to Lx of the scanning line 5 for transition to an electric charge accumulation state, and execution of the process of reading the image data D from each radiation detecting device 7 by controlling the operation of the scanning driving unit 15, the reading circuit 17, and the like.

In this embodiment, the controller 22, as described above, stores the read image data D in the storage unit 23. In addition, the controller 22 is configured to cause the communication unit 30 to transmit the image data D to an image processing apparatus, which is not illustrated in the drawing, through the antenna 29 or the connector 27 at a predetermined timing using a radio system or a wired system.

Radiation image capturing apparatuses are largely divided into a radiation image capturing apparatus of a so-called linked type performing capturing by exchanging signals or the like (linked) with a radiation emitting apparatus, which is not illustrated in the drawing, emitting radiation to the radiation image capturing apparatus and a radiation image capturing apparatus of a so-called non-linked type performing capturing without exchanging signals or the like (non-linked) between the radiation image capturing apparatus and a radiation emitting apparatus. The radiation image capturing apparatus 1 according to this embodiment may be configured as any one type thereof by changing the control executed by the controller 22.

Figure 6:
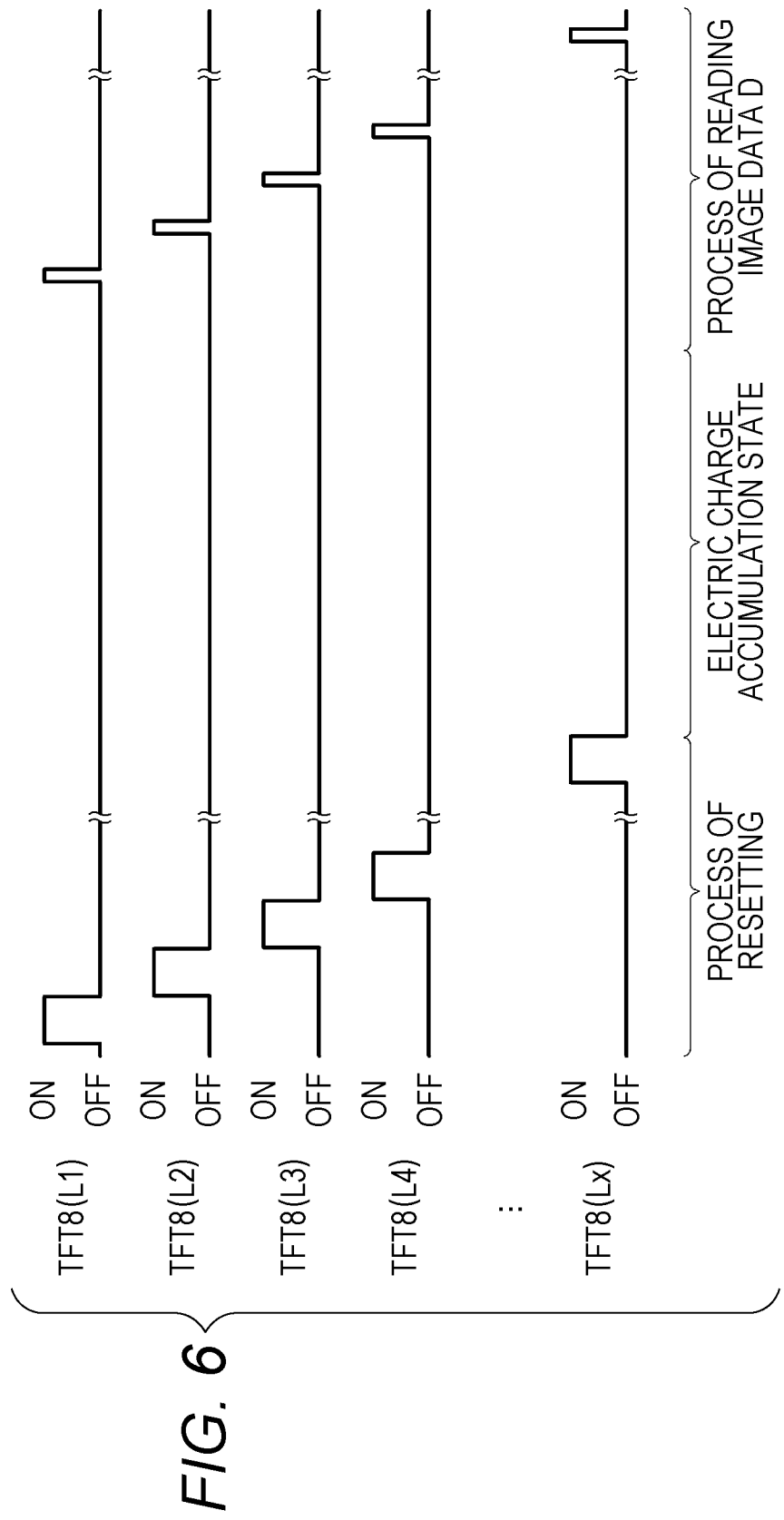
FIG. 6 is a timing diagram that illustrates timings at which an On voltage is applied to each scanning line and the like when capturing is performed in a cooperation system.

The controller 22 of a case where the radiation image capturing apparatus 1 is configured as the linked type, as illustrated in FIG. 6, sequentially applies the On voltage to each line L1 to Lx of the scanning lines 5 from the gate driver 15b (see FIG. 3) of the scanning driving unit 15 to perform the process of resetting the radiation detecting devices 7 before radiation is emitted.

Then, when a signal indicating the emission of radiation is transmitted from the radiation emitting apparatus, the controller 22 applies the Off voltage to each line L1 to Lx of the scanning lines 5 for transition to an electric charge accumulation state in which electric charge generated inside each radiation detecting device 7 in accordance with the emission of radiation is accumulated in each radiation detecting device 7.

Then, when the emission of radiation ends, the controller 22 performs the process of reading image data D by sequentially applying the On voltage to each line L1 to Lx of the scanning lines 5 from the gate driver 15b.

On the other hand, in a case where the radiation image capturing apparatus 1 is configured as the non-linked type, the radiation image capturing apparatus 1 cannot receive a signal indicating the emission of radiation from the radiation emitting apparatus unlike the case of the linked type described above and is configured to independently detect the start of emission of radiation.

For the process of detecting the start of emission of radiation, for example, a method described in JP 2009-219538 A, WO 2011/135917 A, WO 2011/152093 A, or the like may be used, and each official gazette may be referred to for details.

Figure 7:
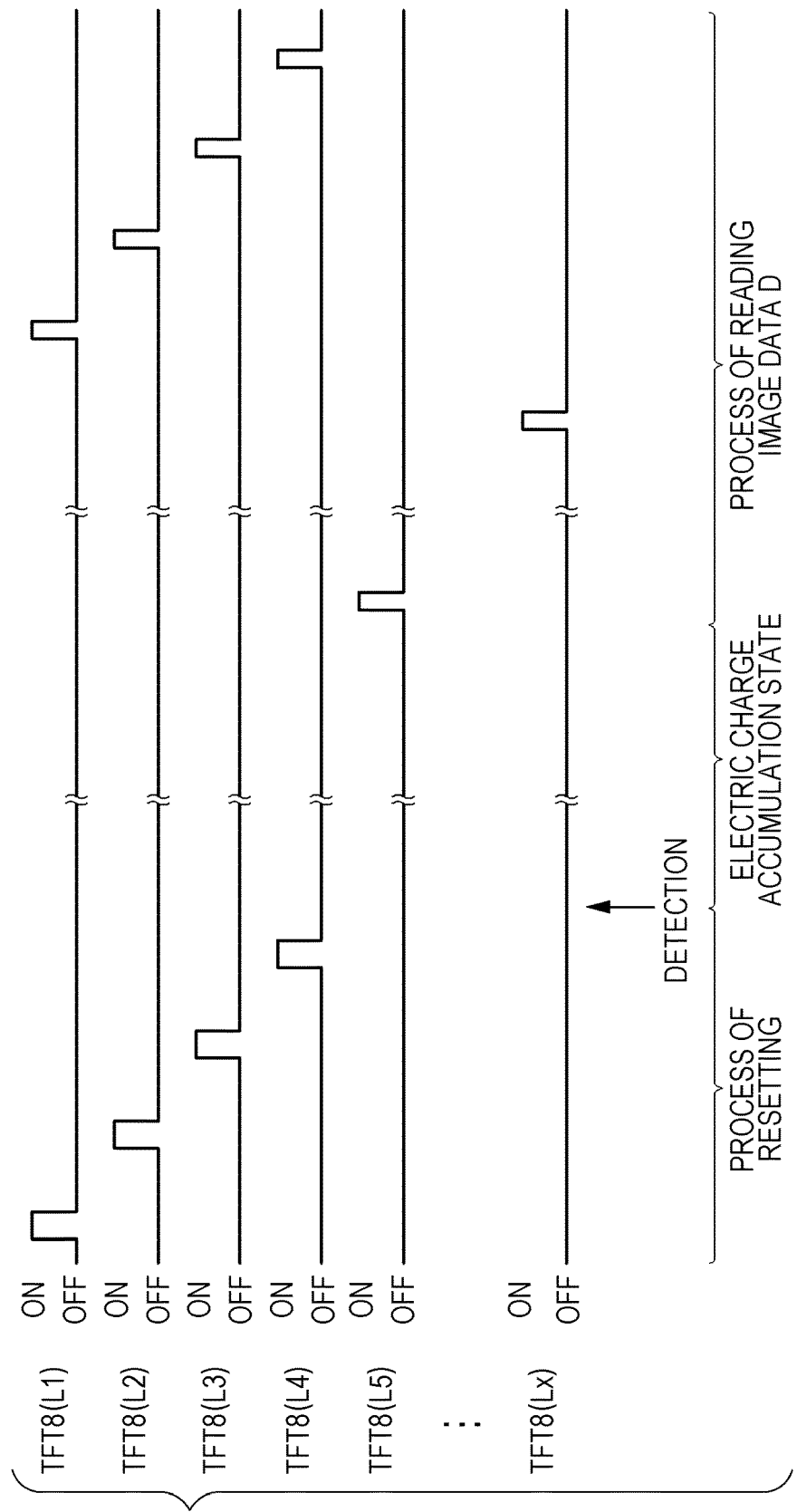
FIG. 7 is a timing diagram that illustrates timings at which an On voltage is applied to each scanning line and the like when capturing is performed in a non-cooperation system.

The controller 22 in the case of the non-linked type, as illustrated in FIG. 7, performs the process of resetting the radiation detecting device 7 by sequentially applying the On voltage to each line L1 to Lx of the scanning lines 5 from the gate driver 15b before the emission of radiation.

Then, when the start of the emission of radiation is detected, the controller 22 applies the Off voltage to each line L1 to Lx of the scanning lines 5 for transition to the electric charge accumulation state and performs the process of reading image data D by sequentially applying the On voltage to each line L1 to Lx of the scanning lines 5 from the gate driver 15b after the emission of the radiation.

In this way, the present invention can be applied to a case where capturing is performed using any one of the linked system and the non-linked system.

In the radiation image capturing apparatus 1, after the capturing as described above or before capturing (in a state in which radiation is not emitted to the radiation image capturing apparatus 1), the process of reading offset data O is configured to be performed by repeating the processing sequence up to the process of reading image data D illustrated in FIG. 6 and the like.

Inside the radiation detecting device 7, dark electric charge (also referred to as a dark current) is constantly generated according to heat excitation due to heat (temperature) of the radiation detecting device 7, and an offset component according to the dark electric charge is superimposed on the image data D. Dark image data O is data corresponding to an offset component according to the dark electric charge, and, by subtracting the dark image data O from the image data D in accordance with the following Equation (1) to perform offset correction of the image data D, whereby real image data D* according to electric charge generated inside the radiation detecting device 7 according to the emission of radiation can be calculated.

$$D^* = D - O \quad (1)$$

[Noise Detector]

Figure 8:
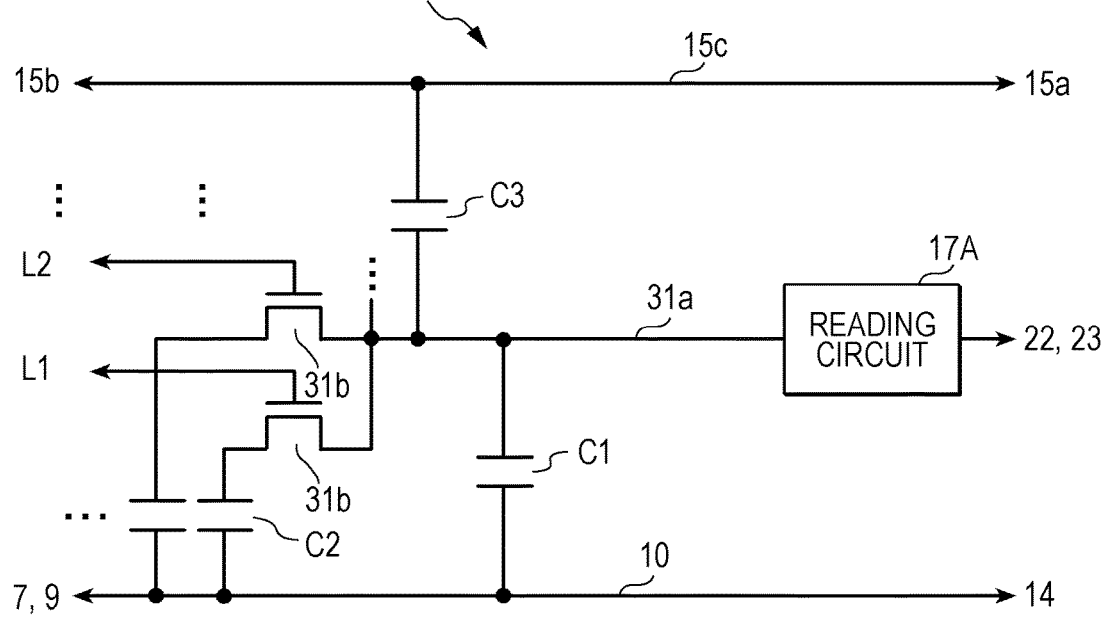
FIG. 8 is a diagram that illustrates an example of the configuration of a noise detector.

Next, the configuration and the like of the noise detector of the radiation image capturing apparatus 1 will be described. FIG. 8 is a diagram that illustrates an example of the configuration of the noise detector.

The radiation image capturing apparatus 1 according to this embodiment includes a noise detector 31. The noise detector 31 detects data corresponding to a noise component superimposed on the image data D read in the process of reading the image data D as described above.

The noise detector 31, for example, may be disposed on the surface 4a side or the rear face side of the sensor substrate 4 (see FIG. 2) and may be disposed on the flexible circuit board described above. A reference sign of an arrow part illustrated in FIG. 8 described below represents a connection destination to which each wiring is connected.

In addition, a plurality of noise detectors 31 may be disposed in one radiation detecting part P.

The noise detector 31 according to this embodiment, as illustrated in FIG. 8, includes a correction signal line 31a, capacitors C1 to C3, and a reading circuit 17A connected to the correction signal line 31a. In this embodiment, as the reading circuit 17A of the noise detector 31, the reading circuit 17 formed inside each reading IC 16 (see FIGS. 3 and 4) described above is used.

For this reason, the reading circuit 17A according to this embodiment, similar to the above-described reading circuit 17 (see FIGS. 3 and 4) used for reading image data D, includes an integration circuit 18, a correlated double sampling circuit 19, and the like (not illustrated in FIG. 8). Similar to the case of the signal line 6 described above, the reference voltage V0 is applied to the correction signal line 31a from the integration circuit 18 disposed inside the reading circuit 17A.

In this embodiment, as the reading circuit 17A of the noise detector 31, for example, as illustrated in FIG. 9, the reading circuit 17 (for example, the reading circuit 17 disposed in an end portion of the reading IC 16) to which the signal line 6 is not connected is used. While not illustrated in the drawing, the correction signal line 31a of the noise detector 31 is connected to the reading circuit 17 to which the signal line 6 is not connected.

In addition, while not illustrated in FIG. 9, the correction signal line 31a, for example, is arranged in parallel with the signal line 6 between the gate driver 15b and the signal line 6 closest to the gate driver 15b.

In this embodiment, the reading circuit 17A of the noise detector 31 detects data $d_{31}$ by performing a process similar to the above-described process of reading image data D using another reading circuit 17, and the detected data $d_{31}$ is converted into a digital value by the A/D converter 20 to be stored in the storage unit 23.

In addition, the reading circuit 17A of the noise detector 31 does not need to be configured to use the reading circuit 17 that is disposed inside the reading IC 16 in advance, and a reading circuit separate from the reading IC 16 may be provided.

In this embodiment, the reading circuit 17A of the noise detector 31 has a function for detecting disconnection of the correction signal line 31a. More specifically, the reading circuit 17A monitors a fluctuation width of the bias power supply described above and determines an occurrence of disconnection in a case where the fluctuation width is less than a predetermined threshold.

In addition, as described above, in a case where a plurality of noise detectors 31 are arranged in one radiation detecting part P, each of the noise detectors 31 may be configured to be able to detect an abnormality such as disconnection occurring in the correction signal line 31a. In such a case, the controller 22 may be configured to operate any one of the plurality of noise detectors 31 and cause the other noise detectors 31 to be in a non-operating state at a normal time and, in a case where the operating noise detector 31 detects an abnormality, stop the operation of the noise detector 31 and operate another noise detector 31. In a case where such a configuration is employed, the noise detector 31 forms an abnormality detector according to the present invention.

In such a case, even when an abnormality occurs in the noise detector 31, the correction of image data D can be accurately performed.

A first capacitor C1 among the capacitors C1 to C3, as illustrated in FIG. 8, is a capacitor that converts an electric potential difference between the correction signal line 31a and the connecting wire 10 (or the bias line 9) into electric charge. In addition, a third capacitor C3 is a capacitor that converts an electric potential difference between the correction signal line 31a and the wiring 15c supplying the Off voltage applied to the scanning line 5 from the power supply circuit 15a of the scanning driving unit 15 to the gate driver 15b into electric charge.

Furthermore, a second capacitor C2 is a capacitor that converts an electric potential difference between the correction signal line 31a and the connecting wire 10 into electric charge. The second capacitor C2 is disposed for each line L1 to Lx of the scanning lines 5, and a switching unit 31b performing switching between connection and disconnection with the correction signal line 31a is connected to each second capacitor C2.

Each switching unit 31b has a state switched between On/Off states in accordance with the On voltage or the Off voltage applied to each line L1 to Lx of the scanning lines 5. For this reason, when the On voltage is applied to a certain scanning line 5, each TFT 8 and the switching unit 31b connected to the scanning line 5 become the On state. On the other hand, when the Off voltage is applied to the scanning line 5, each TFT 8 and the switching unit 31b connected to the scanning line 5 become the Off state.

In this embodiment, in this way, the On/Off state of each switching unit 31b is switched according to the On/Off state of each TFT 8 that is a switching device connected to the same scanning line 5. In this embodiment, as illustrated in FIG. 8, sets each configured by the second capacitor C2 and the switching unit 31b corresponding to the number of the scanning lines 5 are arranged. Each switching unit 31b, for example, can be configured using a TFT.

Figure 10:
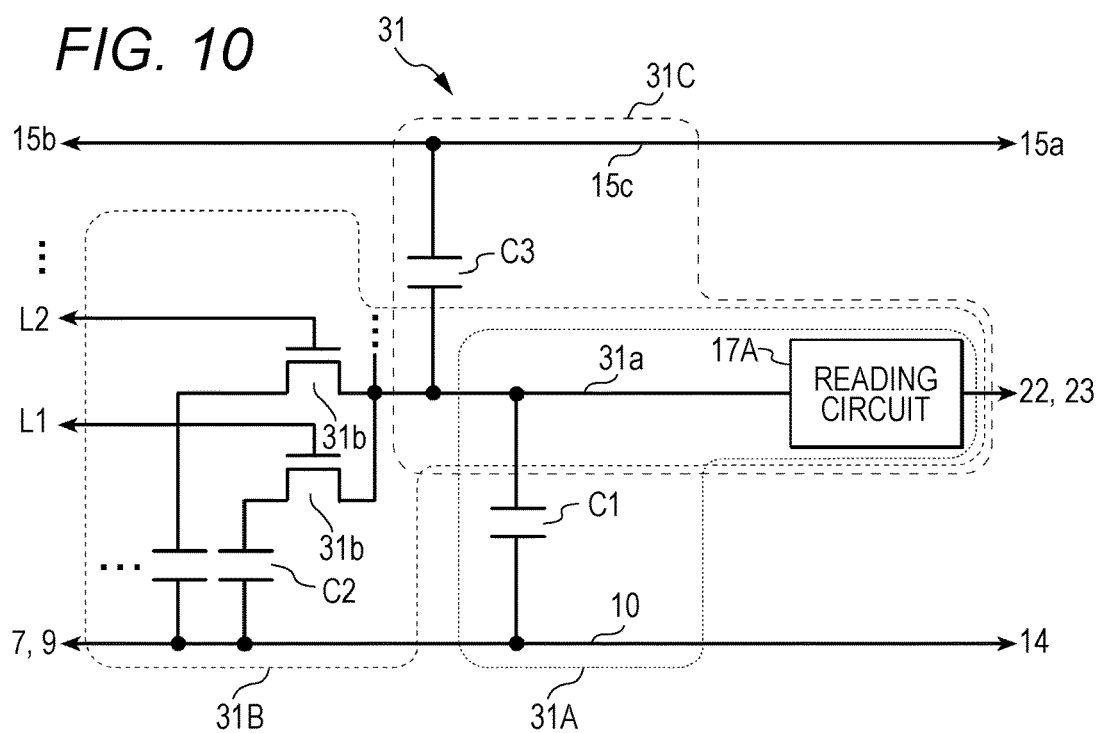
FIG. 10 is a diagram illustrating that the noise detector illustrated in FIG. 8 is configured by noise detectors.

The configuration of the noise detector 31 illustrated in FIG. 8 is, actually, as illustrated in FIG. 10, is acquired by configuring noise detectors 31A, 31B, and 31C to be described later into one unit, the noise detectors 31A, 31B, and 31C may be individually arranged, or any two thereof may be configured to be combined together.

The noise detector 31 is described in detail in JP 2011-142476 A, and the document may be referred to for the detailed description. Hereinafter, each of the noise detectors 31A, 31B, and 31C will be described simply.

[Noise Detector 31A]

Figure 21:
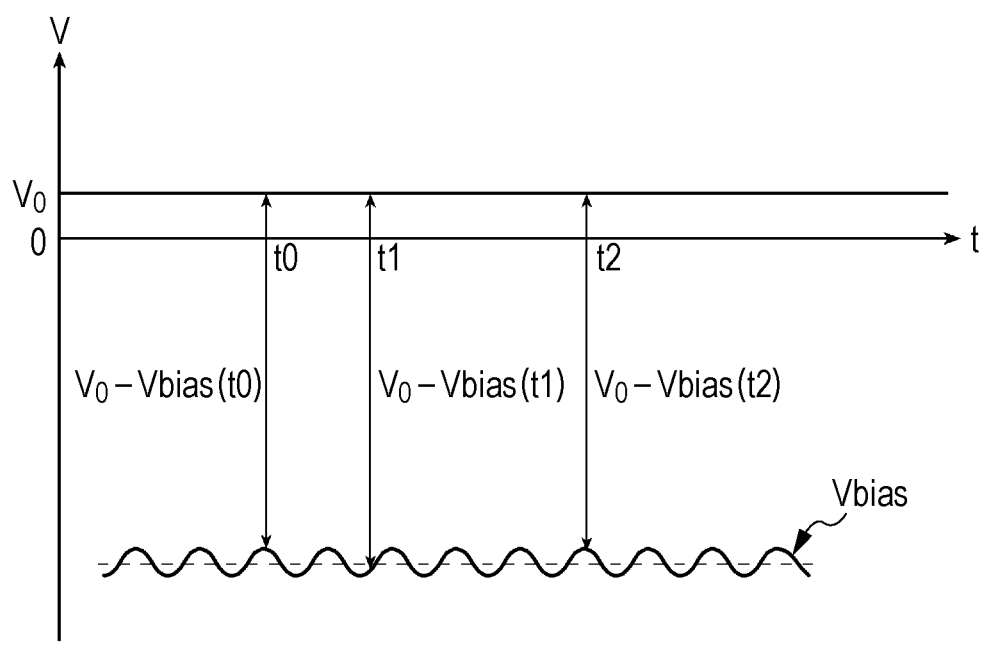
FIG. 21 is a graph that illustrates a noise and the like generated in a reverse bias voltage.

In the noise detector 31A, electric charge of $c1 \times (V0-Vbias)$ (here, c1 is electrostatic capacitance of the first capacitor C1) is accumulated in the first capacitor C1. However, since a voltage noise is generated in the reverse bias voltage Vbias as illustrated in FIG. 21, an electric charge noise corresponding thereto is generated also in electric charge accumulated in the first capacitor C1. In addition, also in electric charge accumulated inside each radiation detecting device 7, an electric charge noise varying at the completely same phase as the voltage noise is generated. Furthermore, the electrostatic capacitance c1 of the first capacitor C1 is set to be the same as the electrostatic capacitance of one radiation detecting device 7.

Then, when the process of reading image data D, as illustrated in FIG. 5B, a first pulse signal Sp1 and a second pulse signal Sp2 are simultaneously transmitted from the controller 22 to the correlated double sampling circuits 19 of both the reading circuit 17 reading the image data D and the reading circuit 17A of the noise detector 31.

For this reason, in the data $d_{31}$ detected by the reading circuit 17A of the noise detector 31, noise data $d_n$ representing an electric charge noise corresponding to the voltage noise of the reverse bias voltage Vbias, which is superimposed on the image data D read from the reading circuit 17 at the same timing, is included. Hereinafter, this noise data $d_n$ will be referred to as noise data $d_{nA}$ caused by the voltage noise of the reverse bias voltage Vbias(t).

Then, according to the process of reading image data D in this way, the On voltage is sequentially applied from the gate driver 15b to each line L1 to Lx of the scanning lines 5, and the noise detector 31A is configured to detect data $d_{31}$ including the noise data $d_{nA}$ and store the detected data $d_{31}$ in the storage unit 23 every time when the image data D is read (in other words, every time when the first and second pulse signals Sp1 and Sp2 are transmitted to the correlated double sampling circuit 19 from the controller 22 at the time of performing the process of reading each line L1 to Lx of the scanning lines 5).

[Noise Detector 31C]

Next, before the description of the noise detector 31B, the noise detector 31C will be described. The noise detector 31C, as described above, is configured by the third capacitor C3, the wiring 15c (or may be the scanning line 5 to which the Off voltage is applied, and the same is applied hereinafter) supplying the Off voltage Voff from the power supply circuit 15a to the gate driver 15b in the scanning driving unit 15, the correction signal line 31a, and the reading circuit 17A.

Since a voltage noise is generated randomly with respect to time also in the Off voltage Voff, similar to the reverse bias voltage Vbias, also in the electric charge of $c3 \times (V0-Voff)$ (here, c3 is the electrostatic capacitance of the third capacitor C3) accumulated in the third capacitor C3, an electric charge noise corresponding thereto is generated.

Meanwhile, as described above, when the process of reading image data D is performed, electric charge accumulated inside the radiation detecting device 7 connected to the scanning line 5 to which the On voltage is applied from the gate driver 15b is discharged to the signal line 6 through the TFT 8 that is in the On state, and the discharged electric charge flows into the reading circuit 17.

At this time, the Off voltage Voff is applied to several thousands of scanning lines 5 other than the scanning line 5 to which the On voltage is applied. As illustrated in FIG. 2 (see B in the drawing), since parasitic capacitance c is generated at the intersection between one signal line 6 and each scanning line 5, electric charge calculated by multiplying the parasitic capacitance c by an electric potential difference V0–Voff between the reference voltage V0 of the signal line 6 and the Off voltage Voff is accumulated at each intersection. In addition, a voltage noise is generated also in the Off voltage Voff as described above.

For this reason, when the capacitance c3 of the third capacitor C3 is set to be the same as a total sum $\Sigma c$ of parasitic capacitance c formed at each intersection between one signal line 6 and the scanning lines 5 intersecting with the signal line 6 described above, in the data $d_{31}$ detected by the reading circuit 17A of the noise detector 31C, noise data $d_{nC}$ representing an electric charge noise (a total sum of electric charge noises at the intersections) corresponding to the voltage noise of the Off voltage Voff, which is superimposed on the image data D read at the same timing as that at which the data $d_{31}$ is detected, is included.

Every time when the On voltage is sequentially applied to each line L1 to Lx of the scanning lines 5 from the gate driver 15b, and image data D is read (in other words, every time when the first and second pulse signals Sp1 and Sp2 are transmitted from the controller 22 to the correlated double sampling circuit 19 at the time of performing the process of reading each line L1 to Lx of the scanning line 5) in the process of reading image data D in this way, the noise detector 31C is configured to detect the data $d_{31}$ including the noise data $d_{nC}$ and store the detected data $d_{31}$ in the storage unit 23.

[Noise Detector 31B]

In the image data D, in addition to the noise data $d_{nA}$ and $d_{nC}$ described above, noise data $d_{nB}$ that is a variation in an electric charge noise corresponding to a difference between a voltage noise of the reverse bias voltage Vbias at a time point at which the voltage applied to the TFT 8 is switched from the On voltage to the Off voltage at the time of performing the process (see FIGS. 6 and 7) of resetting the radiation detecting device 7 and a voltage noise of the reverse bias voltage Vbias at the time point at which the voltage applied to the TFT 8 is switched from the On voltage to the Off voltage at the time of performing the process of reading image data D thereafter is also included.

The noise detector 31B detects the data $d_{31}$ including the noise data $d_{nB}$. In the noise detector 31B, the capacitance c2 of each second capacitor C2 is the same as the parasitic capacitance (or an average value thereof) of each radiation detecting device 7 connected to a certain line Ln of the scanning lines 5 connected to the switching unit 31b connected to the second capacitor C2. As illustrated in FIGS. 6 and 7, when the On voltage is sequentially applied to each line L1 to Lx of the scanning lines 5 from the gate driver 15b, the On voltage is sequentially applied also to each switching unit 31b of the noise detector 31B at the same time.

By configuring as such, as illustrated in FIGS. 6 and 7, when the voltage applied to the TFT 8 and the switching unit 31b of the noise detector 31B is switched from the On voltage to the Off voltage at the time of performing the process of resetting the radiation detecting device 7, a voltage noise generated in the reverse bias voltage Vbias at that time point is accumulated in the third capacitor C3 as an electric charge noise.

When the On voltage is applied to the TFT 8 and the switching unit 31b of the noise detector 31B at the time of performing the process of reading image data D, the applied On voltage is switched to the Off voltage, and the data $d_{31}$ is detected by the reading circuit 17A of the noise detector 31B, the noise data $d_{nB}$ superimposed on the image data D described above is consequently included in the detected data $d_{31}$.

In this embodiment, the noise detector 31B is configured to detect data $d_{31}$ including the noise data $d_{nB}$ superimposed on the read image data D and store the detected data $d_{31}$ in the storage unit 23.

As can be understood from the configuration illustrated in FIGS. 8 and 10, in this embodiment, the data $d_{31}$ simultaneously including the noise data $d_{nA}$, the noise data $d_{nB}$, and the noise data $d_{nC}$ described above is detected. Hereinafter, such a sum value ($d_{nA}+d_{nB}+d_{nC}$) will be described as noise data $d_n$ of each line L1 to Lx of the scanning lines 5. However, it is also possible to independently configure the noise detectors 31A to 31C and individually detect data $d_{31}$ including the noise data $d_{nA}$ to $d_{nC}$ as described above.

Figure 11:
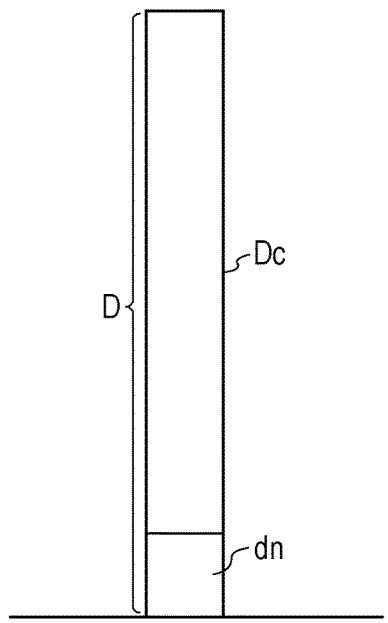
FIG. 11 is a diagram illustrating that noise data is included in read image data and describing image data $D_c$ after correction.

As illustrated in FIG. 11, by calculating the image data $D_c$ after correction by subtracting, from the image data D read for each radiation detecting device 7 as described above, the noise data $d_n$ included in the data $d_{31}$ detected by the noise detector 31 at the same timing by using the following Equation (2), the influence of the horizontal streak noise described above can be eliminated from the image data D.

$$D_c = D - d_n \quad (2)$$

[Offset Component of Reading Circuit]

Figure 12:
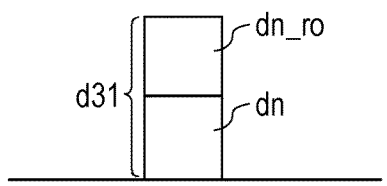
FIG. 12 is a diagram illustrating that an offset component of the noise detector is included in data detected by the noise detector in addition to noise data.

However, as described in JP 2011-142476 A (see a second embodiment in the same document), there are cases where, in addition to the noise data dr, ($=d_{nA}+d_{nB}+d_{nC}$) described above, as illustrated in FIG. 12, an offset component dn_ro of the reading circuit 17A itself of the noise detector 31 is included in the data $d_{31}$ detected by the noise detector 31 also in accordance with the performance of the reading circuit 17A (in this embodiment, the same as the reading circuit 17 reading the image data D) of the noise detector 31.

In such a case, since a sum value of the noise data $d_n$ described above and the offset component dn_ro of the reading circuit 17A is detected by the reading circuit 17A of the noise detector 31 as the data $d_{31}$, when the image data D is corrected by using these as described above, the image data $D_c$ after correction is in the form of the following Equation (3).

$$D_c = D - d_{31}$$

$$\text{Thus, } D_c = D - (d_n + dn\_ro) \quad (3)$$

Figure 13:
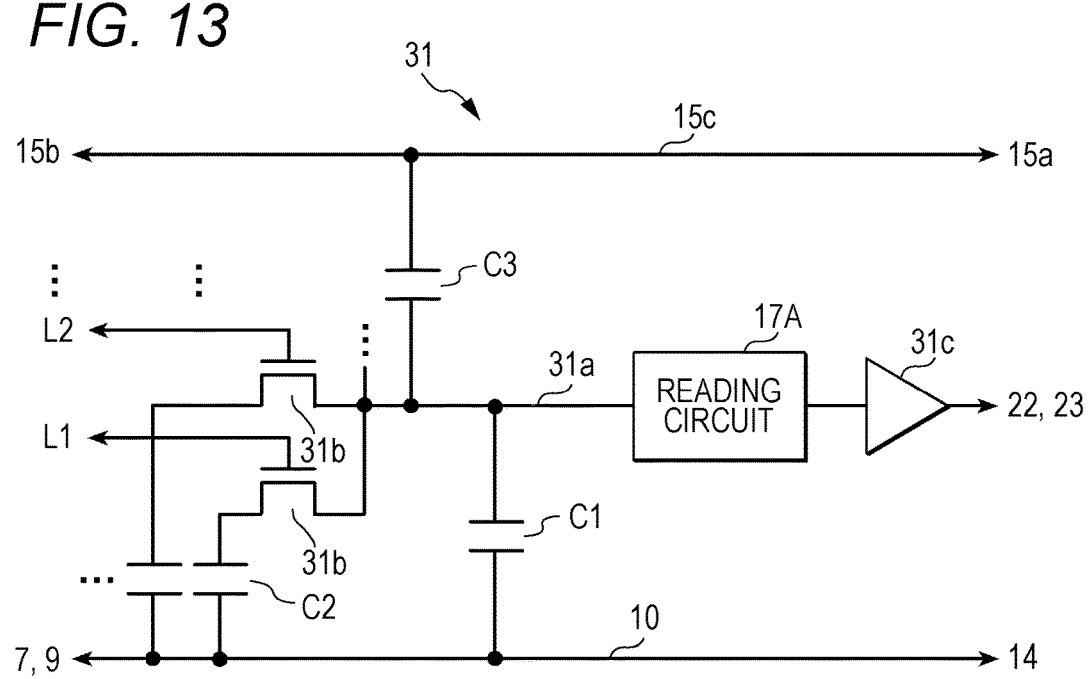
FIG. 13 is a diagram that illustrates another configuration example of the noise detector.

In JP 2011-142476 A, as the electrostatic capacitance c1 to c3 of the capacitors C1 to C3 of the noise detector 31, W times (here, W>1) of those illustrated in FIGS. 8 and 10 are used, and, as illustrated in FIG. 13, a multiplier 31c is arranged on the output side of the reading circuit 17A of the noise detector 31, and the output value from the reading circuit 17A is configured to be multiplied by 1/W.

Figure 14:
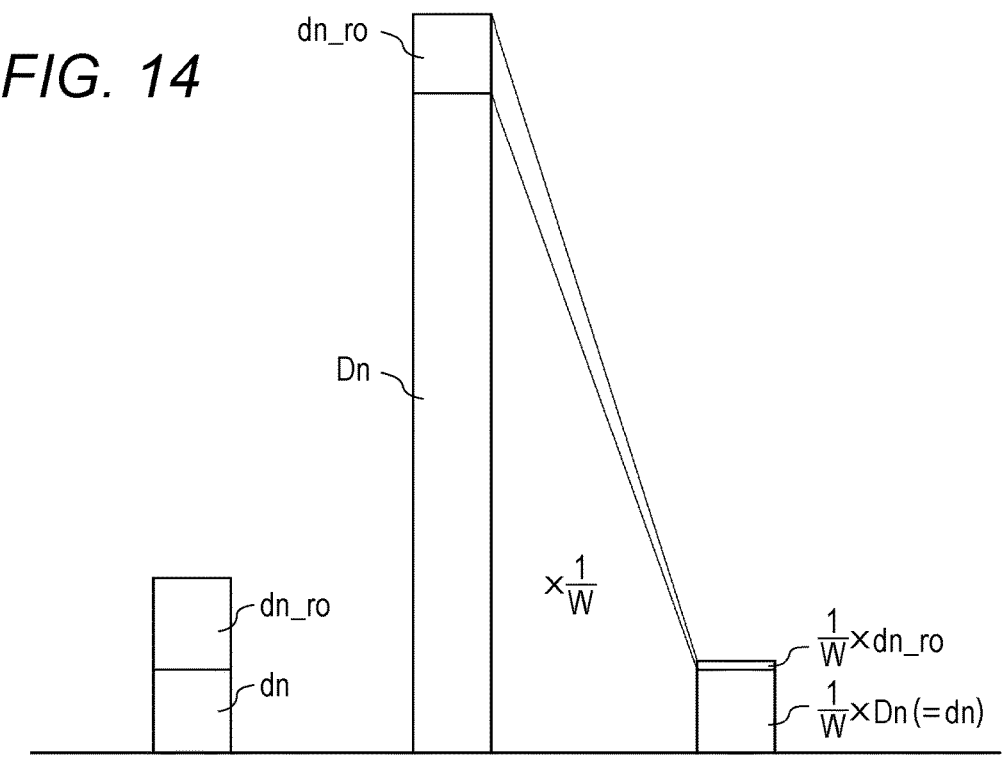
FIG. 14 is a diagram describing that, in the noise detector illustrated in FIG. 13, the offset component of the noise detector is 1/W times that of the noise detector illustrated in FIG. 8.

By configuring as such, as illustrated at the center in FIG. 14, a sum value of the noise data $D_n$ that is W times the noise data $d_n$ and the offset component dn_ro (this is not multiplied by W) of the reading circuit 17A is output as the data $d_{31}$ from the reading circuit 17A of the noise detector 31. As the data $d_{31}$ is multiplied by 1/W by the multiplier 31c, the noise data $D_n$ becomes 1/W times (1/W×$D_n$), and the offset component dn_ro of the reading circuit 17A becomes 1/W times (1/W×dn_ro). Then, the 1/W times of the noise data $D_n$ is equal to the noise data $d_n$ described above.

Figure 15:
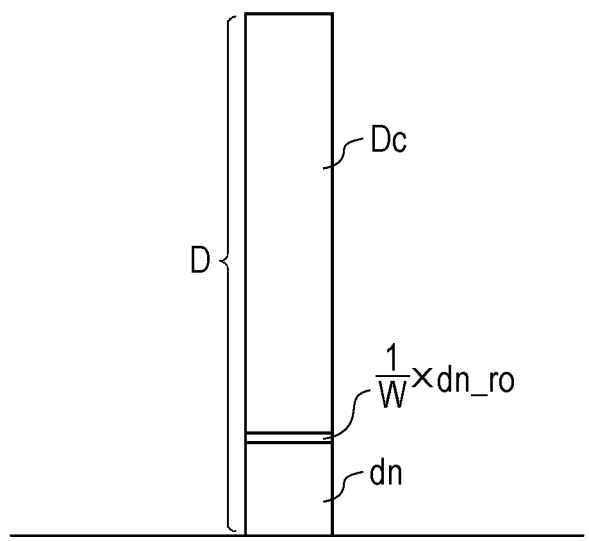
FIG. 15 is a diagram describing that the influence of an offset component of the noise detector from image data after correction is reduced in the noise detector illustrated in FIG. 13.

For this reason, by employing the configuration described above, as illustrated in FIG. 15, the influence of the offset component dn_ro of the reading circuit 17A of the noise detector 31 on the image data D can be reduced by 1/W with the noise data $d_n$ remaining as it is. Then, by setting the value of W to a sufficiently large value, the reciprocal thereof 1/W becomes very small, and it is described in JP 2011-142476 A that the influence of the offset component dn_ro of the reading circuit 17A of the noise detector 31 can be excluded as possible from the image data $D_c$ after correction.

[Offset Component for Each Reading IC]

However, according to the research of the inventors of the present invention, it is understood that the offset component dn_ro (hereinafter, simply referred to as the offset component dn_ro of the noise detector 31) of the reading circuit 17A of the noise detector 31 described above, for example, as illustrated in FIG. 16, changes (increases) according to the progress of the capturing of a frame image configuring a moving image. In addition, it is also understood that the main cause thereof is a change (rise) in the temperature of the reading circuit 17A of the noise detector 31 in accordance with the elapse of time (when the capturing of a frame image is repeated).

Although the influence of the horizontal streak noise can be eliminated by configuring the radiation image capturing apparatus 1 as described above by changing the offset component dn_ro of the signal value in accordance with the elapse of time, the offset component to be subtracted for each frame image configuring a moving image is changed.

In addition, another reading circuit 17 used for reading image data D, similar to the reading circuit 17A of the noise detector 31, the temperature changes (rises) according to the elapse of time, and the offset component dn_ro changes (rises) with respect to time. However, another reading circuit 17 has a circuit configuration different from the reading circuit 17A of the noise detector 31, a change thereof is different from that of the noise detector 31.

In addition, in a case where each noise detector 31 is disposed in a plurality of the reading ICs 16, it is known that a change rate with respect to time (increase rate: the slope of a graph having the number of frames or the elapse time as its horizontal axis and having the signal value as its vertical axis) of the offset component dn_ro is different.

Figure 16:
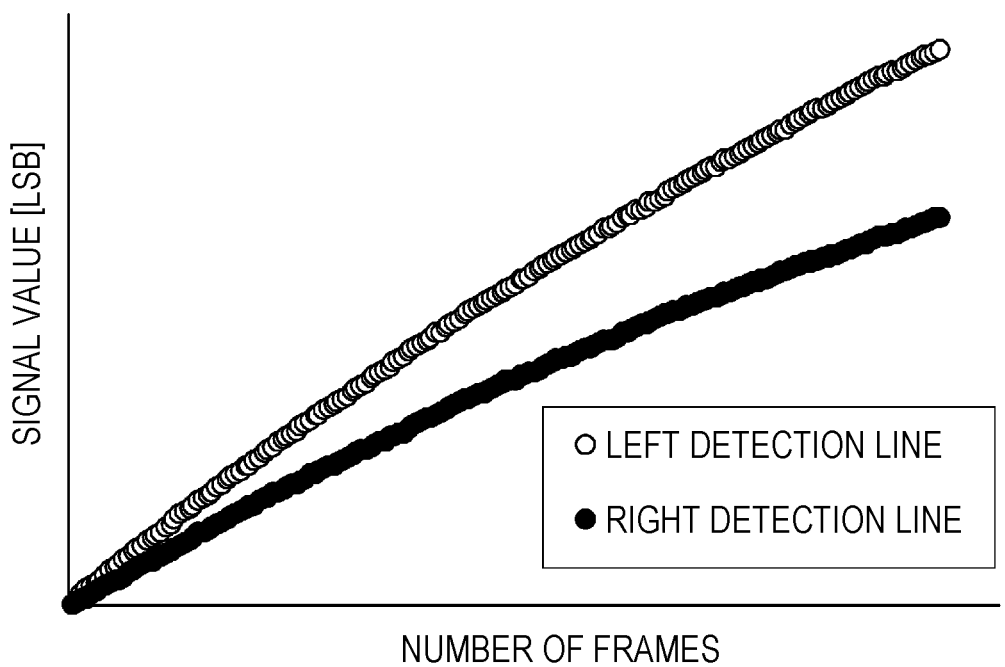
FIG. 16 is a graph that illustrates a change in the offset component of the noise detector with respect to time.

For example, as illustrated in FIG. 9, in a case where left and right half areas of the radiation detecting part P are connected to mutually-different reading ICs 16, in the signal value of the offset component dn_ro, as illustrated in FIG. 16, an opening between the left area and the right area is widened for a later frame image, and accordingly, as the reproduction of a moving image progresses, there is a possibility that level difference unevenness occurs between a right half and a left half of a frame image.

[Characteristic Operation of Radiation Image Capturing Apparatus]

Figure 17:
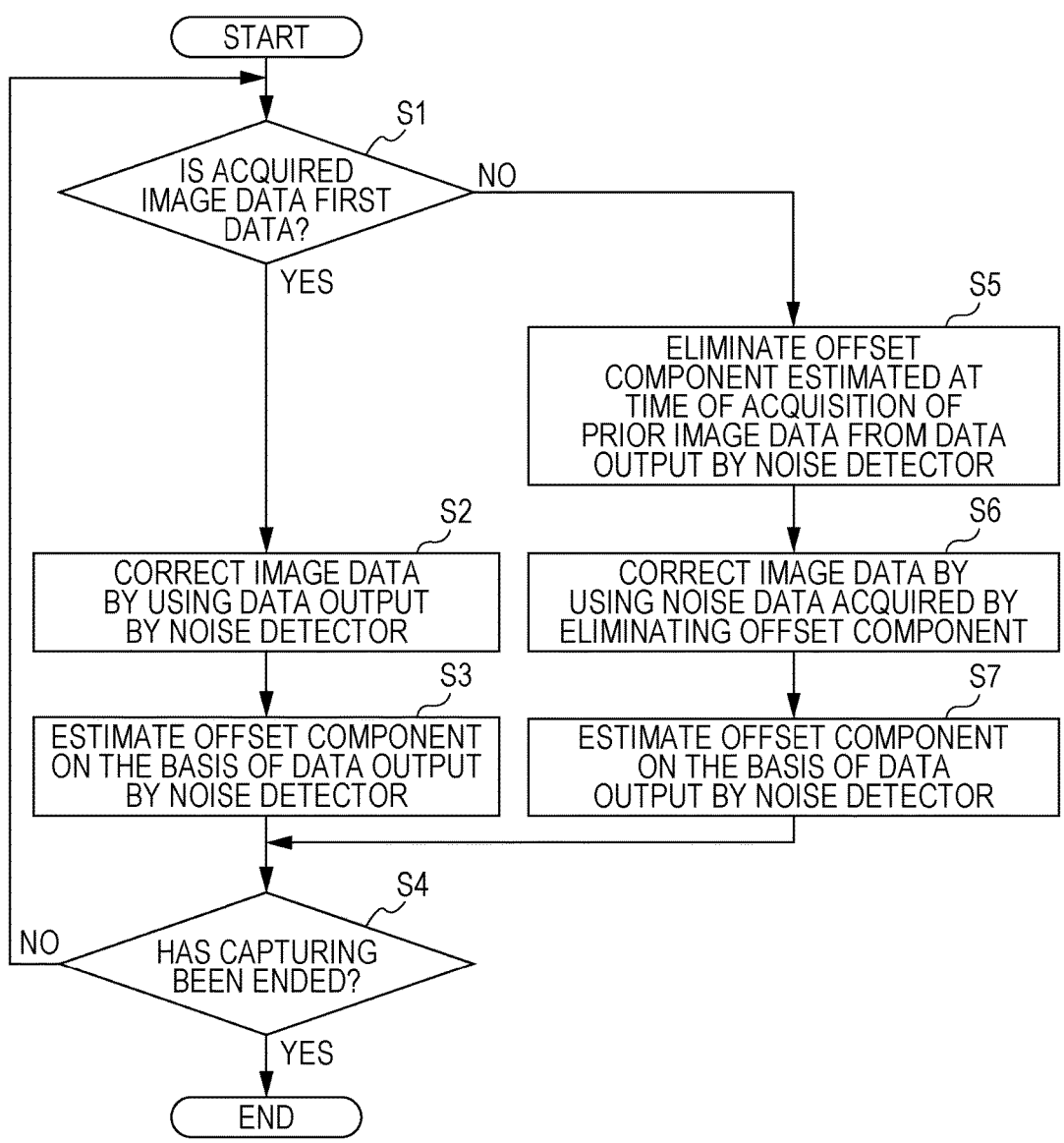
FIG. 17 is a flowchart of a noise correcting process.
Figure 18A:
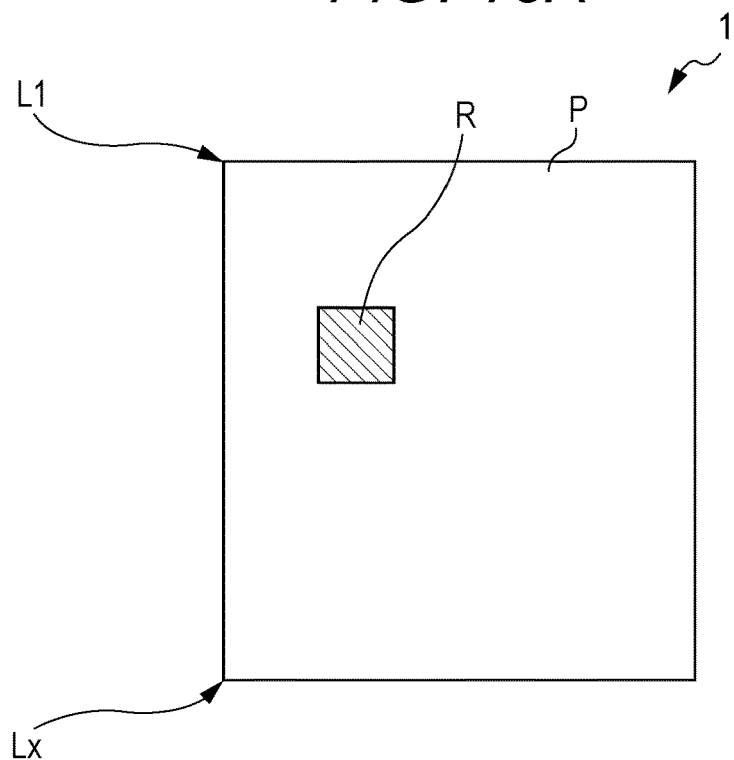
FIGS. 18A and 18B are diagrams that illustrate a state in which radiation is emitted and the like in a state in which an emission field is narrowed in the radiation image capturing apparatus.
Figure 18B:
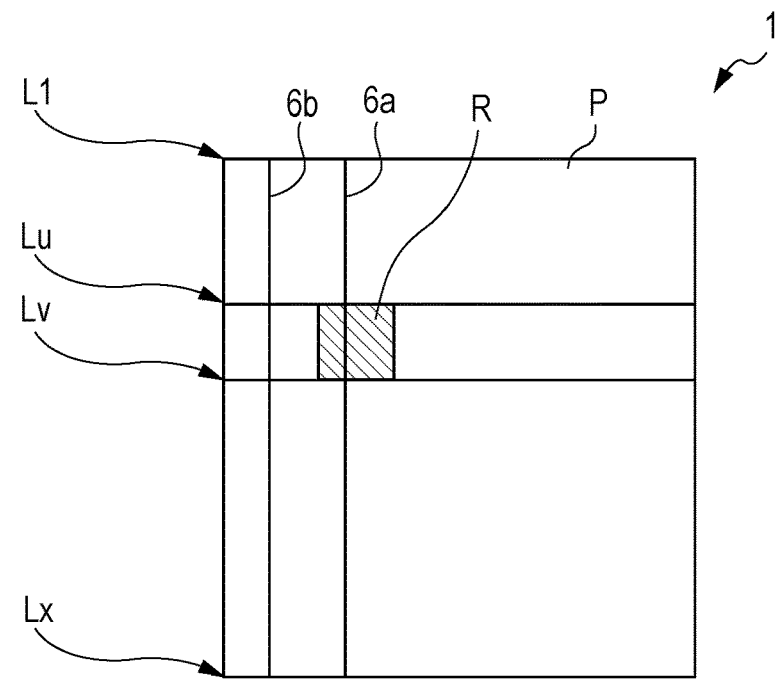
Figure 19A:
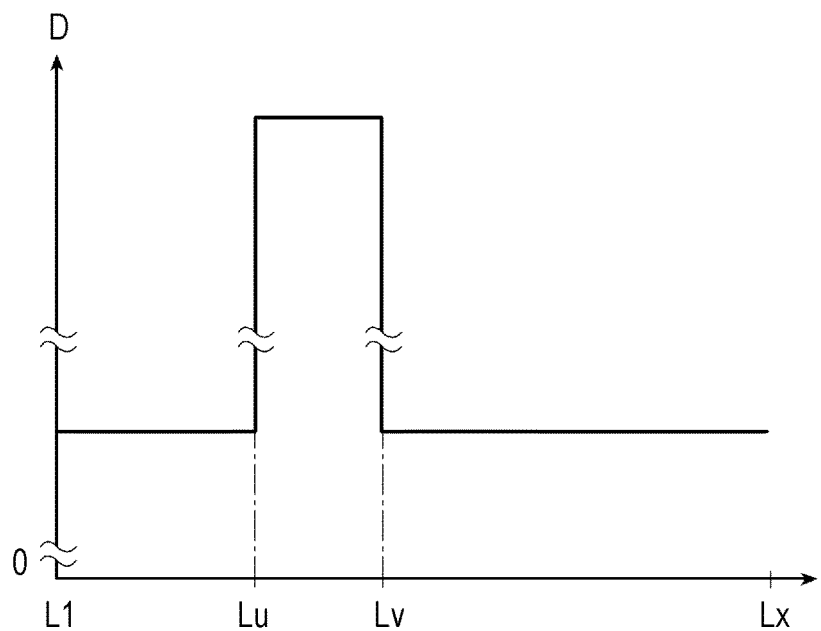
FIGS. 19A and 19B are graphs illustrating image data read from radiation detecting devices respectively connected to a signal line passing through an emission field of radiation and a signal line passing through the outside of the emission field.

Next, the characteristic operation of the radiation image capturing apparatus 1 according to this embodiment, in other words, an operation for reducing the influence of an offset component of a signal value increasing at the time of capturing a moving image will be described. FIG. 17 is an example of a flowchart of a noise correcting process performed by the controller 22 at the time of capturing a moving image. FIGS. 18A, 18B, and 19 are diagrams used for describing a phenomenon called horizontal crosstalk occurring in capturing a radiation image, and FIG. 20 is an example of a flowchart of a noise correcting process to which a process of reducing the influence of horizontal crosstalk is applied.

The controller 22, for example, performs a noise correcting process illustrated in FIG. 17 by being triggered upon the start of a reading process for the acquisition of an offset image before the emission of radiation.

The start of the process may be triggered upon the reception of a signal from the radiation emitting apparatus or the like.

In the noise correcting process, first, it is determined whether or not a read frame image is a first frame image after the start of acquisition of an image using a panel (step S1). In a case where the first frame image (Yes in step S1) is determined, the horizontal streak noise is corrected in a signal of the noise detector 31 (step S2). More specifically, according to the following Equation (4) (Equation (2) descried above), from image data D read from a certain scanning line 5, noise data $d_n$ read by the reading circuit 17A of the noise detector 31 at the same timing as that at which the image data is read is subtracted.

$$D_c = D - d_n \quad (4)$$

After or simultaneously with the process of step S2, an offset component is estimated (step S3). More specifically, in step S2, an average value of data $d_{a1}$ of a plurality of scanning lines 5 (preferably all the scanning lines 5) read by the reading circuit 17A of the noise detector 31 is calculated.

Here, in each read data $d_{31}$, while noise data $d_n$ corresponding to a voltage noise such as the reverse bias voltage Vbias is included, by calculating the average value of each reading IC 16 of the data $d_{31}$ corresponding to a predetermined number of times as described above, the noise data $d_n$ is offset. For this reason, the average value calculated in this process can be regarded (estimated) as an offset component of the noise detector 31. In other words, the controller 22 forms an estimator according to the present invention. Hereinafter, this estimated offset component will be noted by an offset component value dn_roA.

After the process of step S3, it is determined whether capturing of a moving image has ended (step S4). In a case where it is determined that the capturing of a moving image has ended (Yes in step S4), the noise correcting process ends.

On the other hand, in a case where it is determined that the capturing of a moving image has not been ended (No in step S4), the process is returned to the process of step S1.

In the process of step S1, in a case where it is determined that the acquired frame image is not the first frame image (No in step S1), the process proceeds to the process of performing a noise correction for the n-th (here, n=2, 3, . . . ) and subsequent frames. In other words, at the same timing as that of the image data D of the n-th frame image, an offset component estimated value dn_roA estimated at the time of performing the process of the (n−1)-th frame image is subtracted from the data $d_{31}$ read by the reading circuit 17A of the noise detector 31 by using the following Equation (5), whereby noise data $d_n$ is acquired. In other words, the controller 22 forms a noise data calculator according to the present invention.

A rise in the offset component dn_ro according to the elapse of time is gentle, and there is no large difference between the n-th frame and the (n−1)-th frame, and accordingly, the offset component estimated value dn_roA acquired at the time of reading a prior frame image can be used.

$$d_n = d_{31} - dn\_roA \quad (5)$$

After the process of step S5 is performed, a horizontal streak noise of the n-th frame image is corrected (step S6). More specifically, according to the following Equation (6) (Equation (2) described above), the noise data $d_n$ calculated in step S5 is subtracted from the image data D of each radiation detecting device 7 of the n-th frame image, whereby image data $D_c$ after the correction is acquired. In other words, the controller 22 forms an image correcting part according to the present invention.

$$D_c = D - d_n \quad (6)$$

After the process of step S6 is performed, an offset component dn_roA of the n-th frame image is estimated (step S7). More specifically, an average value of the data $d_{31}$ of a plurality of scanning lines 5 (preferably all the scanning lines 5) read by the reading circuit 17A of the noise detector 31 at the same timing as that of the image data D of the n-th frame image is calculated.

After the end of the process of step S7, the process proceeds to step S4, and either the end of the noise correcting process or the repetition of the process is determined.

In this way, in the noise correction for one frame image, the controller 22 uses the offset component estimated value dn_roA on the basis of the data $d_{31}$ output by the noise detector 31 at the same timing as that at which the image data D of a prior frame image is read. For this reason, when a moving image is captured, even in a case where the temperature of the reading IC 16 rises according to the progress of the capturing (the elapse of time), and a phenomenon in which an offset component varies in each frame image occurs, the image data D of each frame image is corrected by using noise data $d_n$ in which an increase in the offset is offset. Accordingly, it can be prevented that, for a later frame, the actual signal value deviates, and a moving image is difficult to view or has an erroneous content as the time elapses.

For example, as illustrated in FIG. 18A, a case will be described in which radiation is emitted in a state in which the emission field R is narrowed for the radiation detecting part P of the radiation image capturing apparatus 1. In such a case, when the range of the emission field R of radiation emitted to the radiation image capturing apparatus 1 is lines Lu to Lv of the scanning lines 5, as illustrated in FIG. 18B, for example, image data D read from the radiation detecting device 7 connected to the signal line 6a passing through the emission field R of radiation is, naturally, as illustrated in FIG. 19A, has a larger value in the part of the lines Lu to Lv of the scanning line 5 than in the other parts.

Figure 19B:
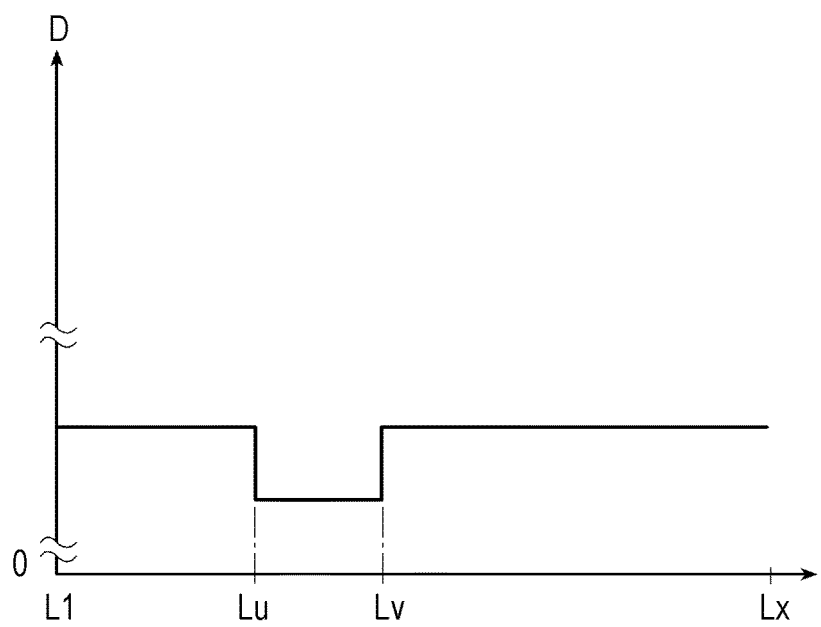
Figure 20:
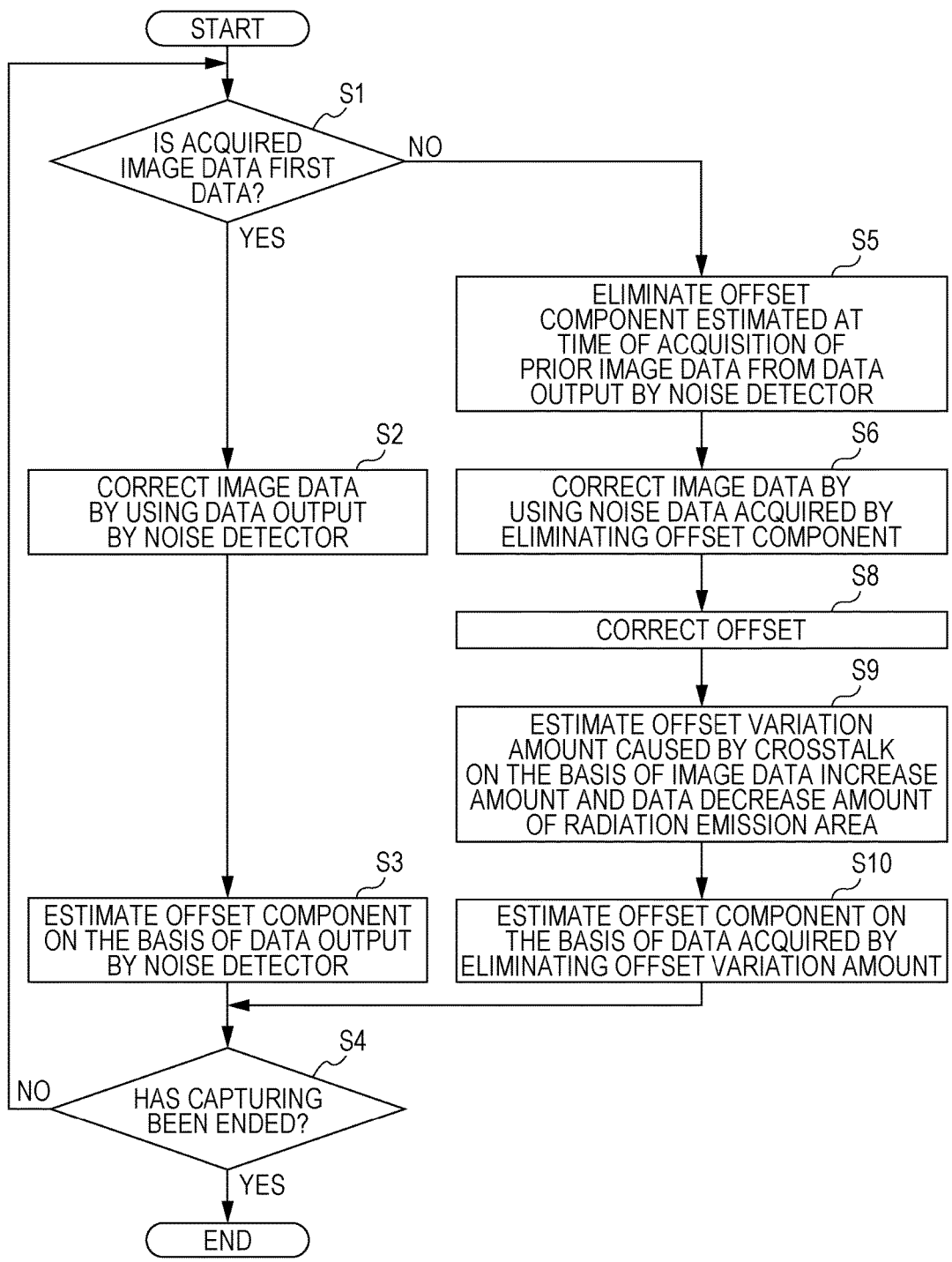
FIG. 20 is a flowchart of a noise correcting process.

Meanwhile, while image data D read from the radiation detecting device 7 connected to the signal line 6b (see FIG. 18B) passing through the outside of the emission field R of radiation may be considered to have a same value due to no emission of radiation to each radiation detecting device 7, actually, as illustrated in FIG. 19B, it is known that a phenomenon in which image data has a smaller value in the part (in other words, a part corresponding to the emission field R) of the lines Lu to Lv of the scanning lines 5 than in the other parts occurs. Such a phenomenon is called horizontal crosstalk.

Therefore, also in the noise detector 31, in a case where the switching unit 31b connected to each line L1 to Lx of the scanning line 5 including the lines Lu to Lv described above is controlled to be turned On/Off to detect data $d_{31}$, there is a possibility that the same phenomenon as that illustrated in FIG. 19B occurs for the detected data $d_{31}$.

In a case where such a phenomenon occurs, even when an On voltage is applied to a plurality of scanning lines 5 including the lines Lu to Lv of the scanning lines 5, and an average value of the data $d_{31}$ detected with each switching unit 31b of the noise detector 31 sequentially being in the On state is calculated, the noise data is not offset, and there is a possibility that the offset component estimated value dn_roA of the noise detector 31 cannot be accurately calculated.

In order to eliminate the influence of the horizontal crosstalk, the flow of the noise correcting process performed by the controller 22 at the time of capturing a moving image may be changed as illustrated in FIG. 20. More specifically, the process of step S7 illustrated in FIGS. 19A and 19B is replaced by steps S8 to S10 illustrated in FIG. 20.

In other words, in the changed noise correcting process, after the process of step S6 is performed (image data $D_c$ after correction is acquired), an offset correction is performed (step S8). More specifically, according to the following Equation (7) (Equation (1) described above), dark image data O (corresponding to an offset component) is subtracted from the image data $D_c$ after the correction, whereby real image data D* caused by electric charge generated according to the emission of radiation is acquired.

$$D^* = D_c - O \tag{7}$$

After the end of the process of step S8, an offset variation amount $d_{ct}$ of the data $d_{31}$ according to horizontal crosstalk is estimated (step S9). More specifically, by multiplying a sum or an average value of a plurality of pieces of image data D corresponding to scanning line L1 to Lx read by the reading circuit 17 of the reading IC 16 by the predetermined constant α of proportionality, an offset variation amount $d_{ct}$ caused by the horizontal crosstalk of the data $d_{31}$ output by the noise detector 31 is calculated. In other words, the controller 22 forms an offset variation amount calculator according to the present invention.

Meanwhile, it is known that there is a relation of proportionality between the amount of an increase in the signal value of real image data D* according to the emission of radiation and the amount of a decrease in the signal value of the data $d_{31}$ read by the reading circuit 17A of the noise detector 31 at the same timing as that of the real image data D*. Thus, the controller 22 according to this embodiment calculates a value of the ratio between the offset variation amount $d_{ct}$ according to the horizontal crosstalk of the data $d_{31}$ output by the noise detector 31 in the middle of execution or before the start of this step S9 and a sum or an average value of signal values varying according to the radiation of the image data D as the coefficient α of proportionality. In other words, the controller 22 forms a coefficient calculator according to the present invention.

When the offset variation amount $d_{ct}$ is calculated, the plurality of pieces of data $d_{31}$ corresponding to each scanning line 5 output by the reading circuit 17A of the noise detector 31 is corrected. More specifically, according to the following Equation (8), the offset variation amount $d_{ct}$ is added to the data $d_{31}$, whereby data $d_{31}$* after the correction from which the influence of the horizontal crosstalk has been eliminated is acquired. In other words, the controller 22 forms a data correcting part according to the present invention.

$$d_{31}^* = d_{31} + d_{ct} \tag{8}$$

After the end of the process of step S9, an offset component estimated value dn_roA is acquired on the basis of the data $d_{31}$* after the correction (step S10). More specifically, an average of a plurality of pieces of the data $d_{31}$* after the correction acquired by the process of step S8 is calculated, and the acquired average value is set as an offset component estimated value dn_roA.

After the end of the process of step S10, the process proceeds to the process of step S4.

In this way, in the noise correction of one frame image, the controller 22 corrects horizontal crosstalk (a decrease in the signal value of the data $d_{31}$) generated according to the emission of radiation to the radiation image capturing apparatus 1 at the time of performing capturing and then calculates an offset component estimated value used for the noise correction for the next frame image. For this reason, it can be prevented more reliably that, for a later frame, the actual signal value deviates, and a moving image is difficult to view or has an erroneous content as the time elapses.

In addition, the noise correcting process illustrated in FIG. 20 may be configured such that the influence of the horizontal crosstalk of the second frame image is not eliminated, and, by performing the above-described process of steps S8 to S10 after the process of step S2, the influence of the horizontal crosstalk may be eliminated from the second frame image.

Furthermore, in the noise correcting process described above, while a numerical value used for calculating the coefficient α of proportionality is acquired by actually emitting radiation to the radiation image capturing apparatus 1, the bias power supply 14 may be configured to change the reverse bias voltage, and, by changing the reverse bias voltage in a state in which the Off voltage is applied to each line L1 to Lx of the scanning lines 5, a state may be formed in which radiation is imaginarily emitted to the radiation image capturing apparatus 1. In such a case, the bias power supply 14 forms a voltage changer according to the present invention. Also by performing as such, an increase in the signal value of the read image data D and a decrease in the signal value of the data $d_{31}$ occur, and the coefficient α of proportionality can be calculated without using radiation.

While not illustrated in the drawing, in a case where a power supply circuit supplying power to some of the reading ICs 16 among the reading ICs 16 and a power supply circuit supplying power to the other reading ICs 16 are different from each other, when data $d_{31}$ or the like detected by the noise detector 31 using the reading circuit 17A belonging to the reading IC 16 to which power is supplied from one power supply circuit is used, there are cases where the image data D read by the reading circuit 17 belonging to the reading IC 16 to which power is supplied from the other power supply circuit cannot be accurately corrected.

For this reason, in the cases described above, it is preferable that the correction process of image data D according to the present invention is configured to be performed for each reading IC 16 to which power is supplied from each power supply circuit.

Although embodiments of the present invention have been described and illustrated in detail, the disclosed embodiments are made for purposes of illustration and example only and not limitation. The scope of the present invention should be interpreted by terms of the appended claims. An appropriate change can be made unless it departs from the gist of the present invention.

What is claimed is:

1. A radiation image capturing apparatus that generates a plurality of frame images by consecutively repeating generation of electric charge in a radiation detecting device and reading of image data using a data reading part, the radiation image capturing apparatus comprising:
   a plurality of radiation detecting devices that are arranged on a substrate to be distributed in a two-dimensional shape and can generate electric charge by receiving radiation;
   a voltage applying part that applies a reverse bias voltage to each of the plurality of radiation detecting devices;
   the data reading part that reads image data on the basis of electric charge generated by each of the plurality of radiation detecting devices; and
   a noise detector that detects a voltage noise of the reverse bias voltage and outputs data on the basis of the voltage noise in accordance with the reading of the image data,
   wherein the data reading part includes:
      an estimator that estimates an offset component of the noise detector on the basis of data corresponding to a prior frame image output by the noise detector in accordance with reading of image data of the prior frame image of one frame image among the plurality of frame images;
      a noise data calculator that calculates noise data on the basis of the data output by the noise detector in accordance with the reading of the image data of the one frame image and the offset component of the noise detector estimated by the estimator on the basis of the data corresponding to the prior frame image output by the noise detector in accordance with the reading of the image data of the prior frame image;
      an image correcting part that generates image data after correction by eliminating the noise data calculated by the noise data calculator in accordance with the reading of image data of the one frame image from the image data of the one frame image; and
   a hardware processor including:
      an offset variation amount calculator that calculates an offset variation amount of the noise detector caused by horizontal crosstalk of the data output by the noise detector by multiplying a sum or an average value of image data of the radiation detecting devices corresponding to each scanning line read by reading circuits of reading ICs by a predetermined coefficient; and
      a data correcting part that corrects a plurality of pieces of data corresponding to each scanning line output by the noise detector on the basis of the offset variation amount of the noise detector calculated by the offset variation amount calculator.

2. The radiation image capturing apparatus according to claim 1,
   wherein the estimator calculates an average value or a median value of signal values of a plurality of pieces of data corresponding to each scanning line output by the noise detector as an estimated value of the offset component of the noise detector, and
   the noise data calculator calculates the noise data by removing the estimated value of the offset component of the noise detector calculated by the estimator from a signal value of data output by the noise detector.

3. The radiation image capturing apparatus according to claim 1, wherein the offset variation amount calculator includes a coefficient calculator that calculates a value of a ratio of the offset variation amount of the noise detector caused by the horizontal crosstalk of the data output by the noise detector to a sum or an average value of image data corresponding to a scanning line connected to the radiation detecting device receiving radiation as the coefficient.

4. The radiation image capturing apparatus according to claim 1,
   further comprising a voltage changer that can change a reverse bias voltage,
   wherein the offset variation amount calculator includes a coefficient calculator that calculates a value of a ratio of the offset variation amount of the noise detector caused by the horizontal crosstalk of the data output by the noise detector to a sum or an average value of image data corresponding to a scanning line connected to the radiation detecting device of which the reverse bias voltage is changed by the voltage changer as the coefficient.

5. The radiation image capturing apparatus according to claim 1,
   wherein the noise detector is a plurality of noise detectors, each of the noise detectors includes an abnormality detector that can detect an abnormality occurring in a correction signal line, and
   the hardware processor operates one of the plurality of the noise detectors and sets the other noise detectors to be in a non-operating state, and in a case where an abnormality is detected by the abnormality detector of the operating noise detector, stops the operation of the noise detector and operates the other noise detector.

* * * * *